(12) United States Patent
Fukino et al.

(10) Patent No.: US 8,564,895 B2
(45) Date of Patent: Oct. 22, 2013

(54) LENS BARREL, AN IMAGING DEVICE, A OPTICAL SYSTEM RETAINING METHOD AND A MANUFACTURING METHOD

(75) Inventors: Kunihiro Fukino, Fujisawa (JP); Kazuyasu Oone, Saitama (JP); Masaaki Tanabe, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/490,372

(22) Filed: Jun. 6, 2012

(65) Prior Publication Data

US 2012/0243112 A1    Sep. 27, 2012

Related U.S. Application Data

(63) Continuation of application No. 12/654,551, filed on Dec. 23, 2009, now abandoned.

(30) Foreign Application Priority Data

Dec. 26, 2008  (JP) ................. 2008-334441
Feb. 17, 2009  (JP) ................. 2009-034415

(51) Int. Cl.
  *G02B 7/02*    (2006.01)
(52) U.S. Cl.
  USPC ....................................... 359/823
(58) Field of Classification Search
  USPC .............. 359/822–826, 694–706; 396/73, 85, 396/439, 448, 529
  See application file for complete search history.

(56) References Cited

U.S. PATENT DOCUMENTS

| 6,504,656 | B1 | 1/2003 | Winterot et al. |
| 6,654,182 | B2 | 11/2003 | Miyakawa |
| 7,623,151 | B2 | 11/2009 | Noguchi |

FOREIGN PATENT DOCUMENTS

| JP | A 05-066335 | 3/1993 |
| JP | A 06-034869 | 2/1994 |
| JP | A 06-094963 | 4/1994 |
| JP | H06-123830 | 5/1994 |
| JP | A 08-005888 | 1/1996 |
| JP | A 2000-089086 | 3/2000 |
| JP | A 2003-14009 | 5/2003 |
| JP | A 2005-172951 | 6/2005 |
| JP | A 2006-098652 | 4/2006 |
| JP | A 2007-316516 | 12/2007 |
| WO | WO 01/18584 A1 | 3/2001 |

OTHER PUBLICATIONS

Japanese Office Action dated Oct. 12, 2010 issued in Japanese Patent Application No. 2008-334441 (with translation).
Japanese Office Action from Japanese Application No. 2008-334441 mailed Jan. 11, 2011, with English-language translation.
Nov. 30, 2010 Office Action issued in Japanese Patent Application No. 2009-034415 (with translation).

*Primary Examiner* — Tuyen Tra
(74) *Attorney, Agent, or Firm* — Oliff & Berridge, PLC

(57) ABSTRACT

A lens barrel comprising: a first retention member that includes a first engaging portion, which engages with a guide shaft, and that retains a first optical system and a second optical system, which is different from the first optical system, to be integrally movable along the guide shaft; and a second retention member that includes a second engaging portion, which engages with the guide shaft, and that retains a third optical system, which is disposed between the first optical system and the second optical system, to be movable independently of the first and second optical systems.

15 Claims, 19 Drawing Sheets

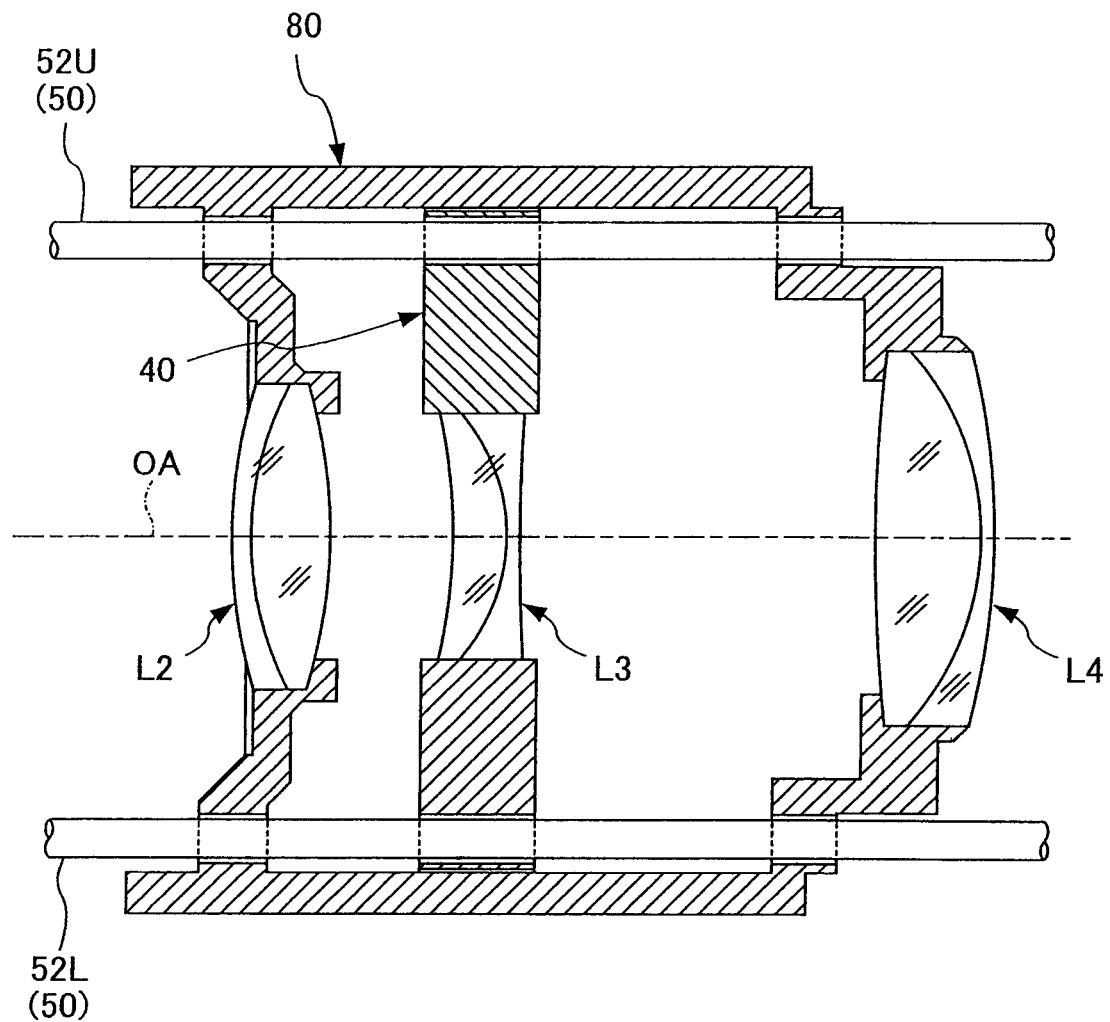

LENS BARREL, AN IMAGING DEVICE, A OPTICAL SYSTEM RETAINING METHOD AND A MANUFACTURING METHOD

This is a Continuation of application Ser. No. 12/654,551 filed Dec. 23, 2009. The disclosure of the prior application is hereby incorporated by reference herein in its entirety. The present application claims priority under 35 U.S.C. §119 to Japanese Patent Applications No. 2008-334441 filed on Dec. 26, 2008 and 2009-034415 filed on Feb. 17, 2009. The content of the applications are incorporated herein by reference in its entirety.

BACKGROUND OF THE INVENTION

1. Field of the Invention

The present invention relates to a lens barrel, an imaging device, a optical system retaining method and a manufacturing method.

2. Description of the Related Art

Heretofore, a guide bar type lens barrel has been known, in Japanese Unexamined Patent Publication No. H6-94963, that is structured using a guide bar such that a plural number of lens units may be moved independently.

In Japanese Unexamined Patent Publication No. 2000-089086, a structure of a zoom lens barrel is recited in which a plural number of lens units are individually moved by cam mechanisms and a focusing distance is altered.

SUMMARY OF THE INVENTION

The guide bar type recited in the above-mentioned Japanese Unexamined Patent Publication No. H6-94963 is structured such that the respective lens units are independently moved. However, with the guide bar type of this related art, no structure at all is proposed such that a lens frame, which integrally retains a plural number of the lens units at a predetermined spacing, and a lens unit, which is disposed between the plural lens units and is independently movable, are engaged with a common guide bar.

Furthermore, the structure of Japanese Unexamined Patent Publication No. 2000-089086 has a complex construction in which a large number of members are assembled, and maintaining precision of assembly between the members is difficult. Moreover, maintainability after completion is poor.

An object of the present invention is to provide a lens barrel that can be structured, with a simple structure, such that a lens frame that integrally retains a plural number of lens units at a predetermined spacing and a lens unit that is disposed between the plural lens units and is independently movable engage with a common guide bar and move, and an imaging device provided with the lens barrel. Moreover, a lens barrel that is easy to assemble and has good maintainability is to be provided.

The present invention solves the above-described problem with the following solution.

In order to achieve the object mentioned above, according to the first aspect of the present invention, there is provided a lens barrel comprising:

a first retention member that includes a first engaging portion, which engages with a first guide shaft, and that retains a first optical system and a second optical system, which is different from the first optical system, to be integrally movable along the first guide shaft; and a second retention member that includes a second engaging portion, which engages with the first guide shaft, and that retains a third optical system, which is disposed between the first optical system and the second optical system, to be movable independently of the first and second optical systems along the first guide shaft.

The first retention member may includes a third engaging portion that engages with the first guide shaft at a spacing from the first engaging portion, the second retention member includes a fourth engaging portion that engages with the first guide shaft at a spacing from the second engaging portion, and the first and third engaging portions and the second and fourth engaging portions alternatingly engage with the first guide shaft.

The first guide shaft may be disposed at an opposite side of the first retention member from a side thereof at which the second retention member is disposed, and the second engaging portion engages with the first guide shaft through a cutaway provided in the first retention member.

The second engaging portion may be separable from the second retention member.

The first retention member may be provided with a reinforcement member at a position of the cutaway that does not interfere with the second engaging portion.

The first guide shaft may be disposed at the same side of the first retention member as the second retention member.

In order to achieve the object mentioned above, according to the second aspect of the present invention, there is provided a method of fabrication of a lens barrel, comprising: providing a first retention member that includes a first engaging portion, which engages with a first guide shaft, and that retains a first optical system and a second optical system, which is different from the first optical system, to be integrally movable along the first guide shaft; and disposing a second retention member that includes a second engaging portion, which engages with the first guide shaft, and that retains a third optical system, which is different from the first optical system and the second optical system, in the first retention member, wherein: the third optical system is movable independently of the first and second optical systems.

The first retention member may comprise an aperture portion with a size that enables insertion of the second retention member on the periphery side.

The aperture portion may have a size that enables insertion of the second retention member while in a state in which an optical axis of the second optical system is substantially parallel with a central axis of the first retention member.

The lens barrel may further comprise: a second guide shaft provided in parallel with the first guide shaft, wherein the first retention member is provided with a fifth engaging portion that engages with the second guide shaft and restrains movement of the first retention member in a circumferential direction, the first engaging portion and the fifth engaging portion are disposed at positions that are substantially opposite along the peripheral face of the first retention member if viewed in the direction of a central axis of the first retention member, and the aperture portion is formed at a position that coincides with the engaging portion if viewed in the direction of the central axis of the first retention member.

The lens barrel may further comprise: a second guide shaft provided in parallel with the first guide shaft, wherein at least one of the first guide shaft and the second guide shaft is disposed along an outer periphery of the first retention member.

The lens barrel may further comprise: a second guide shaft provided in parallel with the first guide shaft, wherein the second retention member is provided with a fourth engaging portion, which engages with to be movable along the second guide shaft, and the second engaging portion and the fourth engaging portion are formed integrally with the second retention member.

The first retention member may be provided with a bearing member that receives driving force when moving along the first guide shaft, and the bearing member and the aperture portion are disposed at positions that are substantially opposite along the peripheral face of the first retention member if viewed in the direction of a central axis of the first retention member.

In order to achieve the object mentioned above, according to the third aspect of the present invention, there is provided an imaging device comprising the above mentioned lens barrel and an imaging unit that captures an image imaged by the lens barrel.

The method of fabrication of a lens barrel may comprise: providing an aperture portion with a size that enables insertion of the second retention member to the periphery side of the first retention member; inserting the second retention member into the first retention member through the aperture portion and disposing the first optical component, the second optical component and the third optical component in order in the first retention member; and inserting a guide shaft through the first retention member and the second retention member.

The manufacturing method may comprising a step disposing a second retention member is inserted into the first retention member after the first optical system and the third optical system have been retained in the first retention member.

The above summary of the invention does not enumerate all necessary features of the present invention. Furthermore, a subcombination of the set of features may provide the invention.

BRIEF DESCRIPTION OF THE DRAWINGS

In the drawings attached:
FIG. 11 is a sectional view corresponding to FIG. 3 of the first embodiment, illustrating a variant example of an arrangement structure of guide bars.

DETAILED DESCRIPTION OF THE PREFERRED EMBODIMENT

First Embodiment

Figure 1:
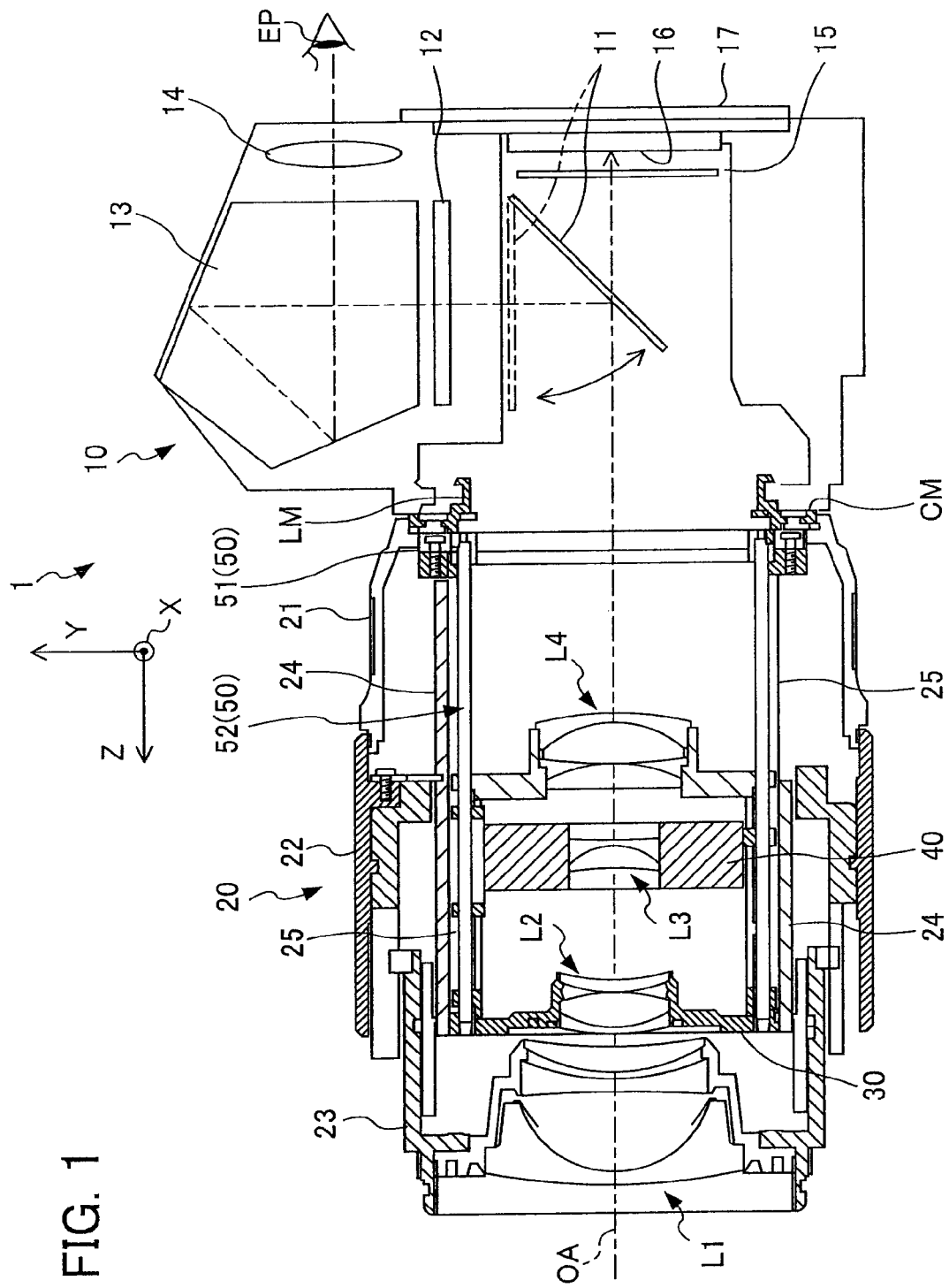
FIG. 1 is a schematic figure of a camera provided with an imaging lens that serves as an embodiment of the lens barrel relating to the present invention.

Herebelow, embodiments of the lens barrel and imaging device relating to the present invention are described referring to the attached drawings. FIG. 1 is a schematic figure of a camera 1 provided with an imaging lens 20 as an embodiment of the lens barrel relating to the present invention.

An XYZ orthogonal co-ordinate system is established in FIG. 1 for ease of explanation and understanding. In this co-ordinate system, for a position of the camera when a photographer is keeping an optical axis OA horizontal and photographing a landscape orientation image (hereinafter referred to as a usual position), a direction to leftward from the photographer's point of view is the +X direction. The direction to upward in the usual position is the +Y position, and the direction toward the object in the usual position is the +Z position. The +Z direction toward the object in this direction is referred to as the front face side, and the −Z direction is referred to as the rear face side.

As illustrated in FIG. 1, the camera 1 of the present embodiment is constituted by a camera body 10 and the imaging lens 20. The imaging lens 20 is provided with a plural number of lens units (L1 to L4) that constitute an imaging optical system, and is detachably mounted at a mount CM of the camera body 10. Thus, the camera 1 may take photographs using different imaging lenses 20 interchangeable in accordance with different purposes.

The camera body 10 is provided with a quick-rerotate mirror 11, a finder screen 12, a pentaprism 13, an eyepiece optical system 14, a shutter 15, an image pickup device 16, a display apparatus 17 and the like.

The quick-rerotate mirror 11 is a mirror that makes the optical path of light from the object side that has passed through the imaging lens 20 (object light) go straight ahead on the image pickup device 16 or bends the light path toward the finder screen 12, and is structured to be rotateable within the camera body 10. In response to a shutter-release operation, the quick-rerotate mirror 11 moves to a retracted position (shown by broken lines in FIG. 1) at which it does not impede the incidence of object light onto the image pickup device 16.

The finder screen 12 is a screen that imaging the object light reflected by the quick-rerotate mirror 11, and is disposed between the quick-rerotate mirror 11 and the pentaprism 13. The pentaprism 13 is a prism with a substantially polygonal cross-section, and is disposed at an upper portion when the camera body 10 is set in the horizontal position. The pentaprism 13 guides an image imaged at the finder screen 12 toward the eyepiece optical system 14 in the form of an upright image.

The eyepiece optical system 14 is an optical system for magnified viewing of the object image formed as an upright image by the pentaprism 13, and is disposed at the rear face side (photographer side) of the pentaprism 13. The shutter 15 opens and closes in accordance with shutter release operations, and controls exposure times of object image light imaging onto the image pickup device 16.

The image pickup device 16 converts the object image imaged by the imaging optical system to electronic signals, and is structured with photodiodes, a CCD, a CMOS or the like. The image pickup device 16 is provided in a state in which a light detection face thereof is orthogonal to the optical axis OA, at the inner side of the camera body 10 (the right side illustrated in FIG. 1).

The display apparatus 17 is structured by a display panel of liquid crystal or the like, provided at the outer side of the rear face side (the photographer side) of the camera body 10. The display apparatus 17 displays captured images, information relating to imaging, such as exposure times and the like, and so forth at the display panel.

In the camera 1 structured as described above, when an unillustrated shutter button is operated by being pressed (the shutter-release operation), the quick-rerotate mirror 11 moves to the retracted position. The shutter 15 opens and closes in accordance with the shutter-release operation, and exposes the object image light onto the image pickup device 16 for a predetermined duration. The image pickup device 16 converts the object image light to electronic signals and captures the image. Image data captured by the image pickup device 16 is stored at an unillustrated storage section.

Next, the imaging lens 20 is described.

The imaging lens 20 is provided with a zoom control ring 22 at a distal end portion of a tubular outer barrel 21. At the inner periphery side of the zoom control ring 22, a first unit barrel 23, which retains the first lens unit L1, a cam barrel 24 and a fixed barrel 25 are provided.

The cam barrel 24 is provided to be rotateable relative to the fixed barrel 25 but immovable in the optical axis OA direction (the Z-axis direction), and is operated by rotating in accordance with rotating of the zoom control ring 22.

At the inner periphery side of the fixed barrel 25, a lens interior tube 30 is provided, which retains the second lens unit L2 and the fourth lens unit L4. A lens mount LM is fixed to a rear face side end portion of the fixed barrel 25.

The lens interior tube 30 has a circular tube shape, with the second lens unit L2 being mounted at a forward side end thereof and the fourth lens unit L4 being mounted at the rear side end.

At the inner periphery side of the lens interior tube 30, the third unit barrel 40 is provided, which retains the third lens unit L3.

The first unit barrel 23, the lens interior tube 30 and the third unit barrel 40 are each provided to be movable in the direction of the optical axis OA (the Z-axis direction). Detailed structures of the first unit barrel 23, the lens interior tube 30 and the third unit barrel 40 are not illustrated. However, they are respectively linked to the cam barrel 24 by cam grooves and cam followers. Thus, the first unit barrel 23, the lens interior tube 30 and the third unit barrel 40 are operated to move in the optical axis OA direction, with predetermined relations, by rotating of the cam barrel 24.

In the imaging lens 20 structured as described above, the first lens unit L1, the lens interior tube 30 (the second lens unit L2 and the fourth lens unit L4) and the third lens unit L3 are respectively moved with predetermined relations and the combined focusing distance is altered by a rotating operation of the zoom control ring 22. The lens interior tube 30 and third unit barrel 40 of the imaging lens 20 are guided by a guide member 50 provided at the fixed barrel 25, and are moved respectively independently in the optical axis OA direction (Z-axis direction). Thus, in the lens barrel of the present embodiment, the lens interior tube 30 that integrally retains plural lens units at predetermined spacings and the third unit barrel 40 that is disposed therebetween and is independently movable are engaged with the common guide member 50, and the lens barrel is structured in a nesting guide bar type.

Next, a structure of the lens interior tube 30 and third unit barrel 40, which is a first embodiment of the present invention, is described referring to FIG. 1 and FIG. 2 to FIG. 5.

Figure 2:
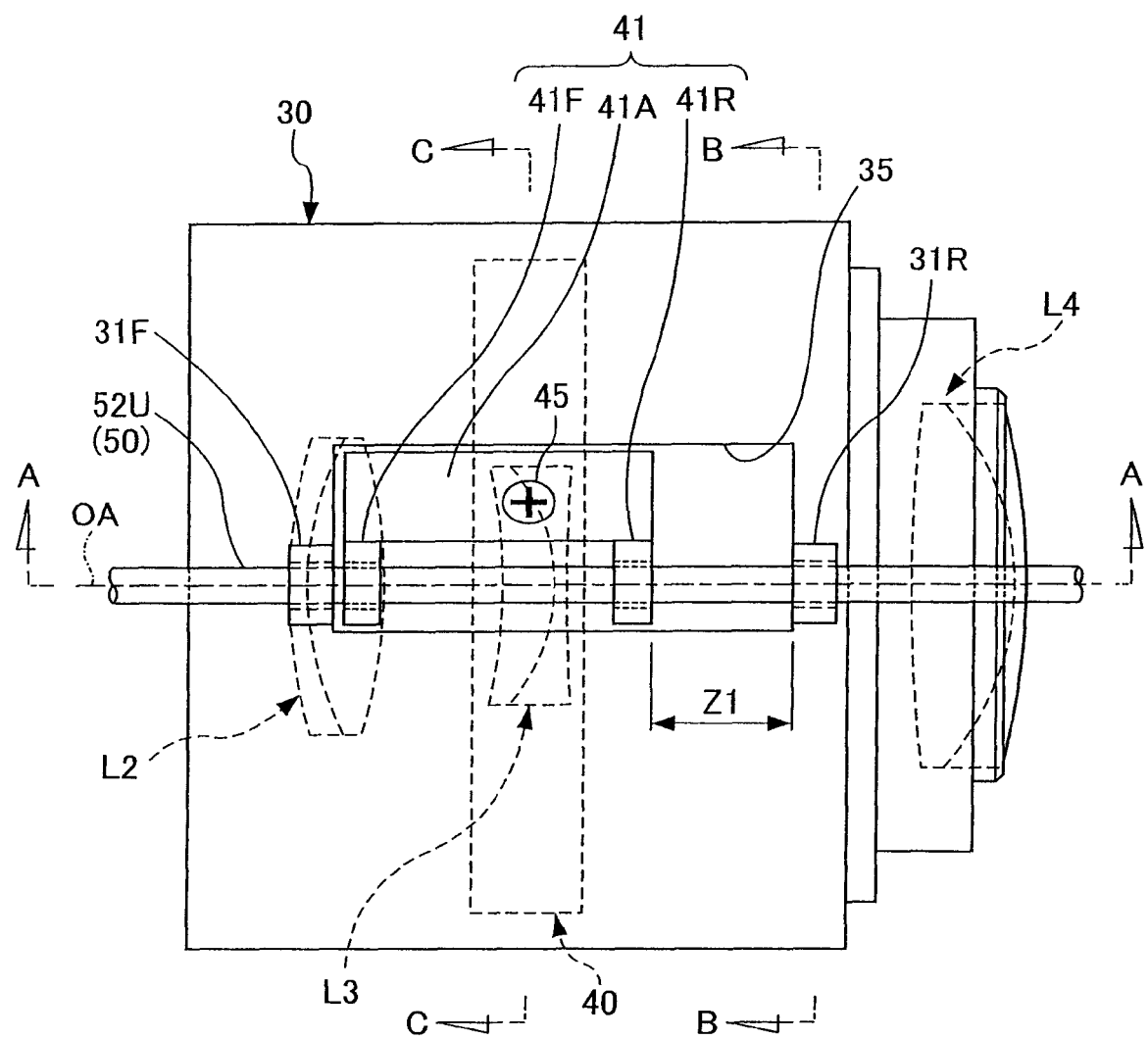
FIG. 2 is a plan view of a lens interior tube relating to a first embodiment.
Figure 3:
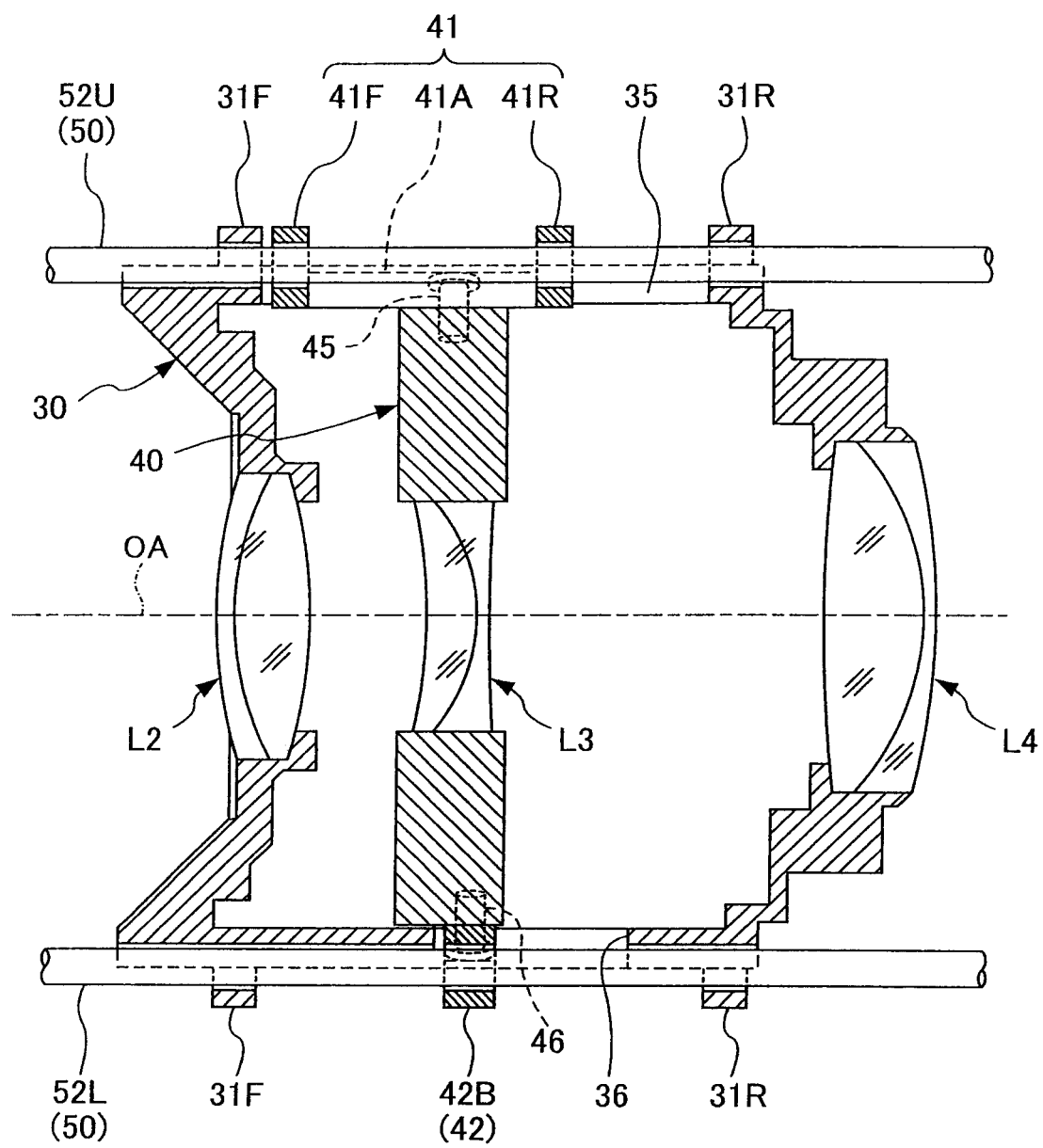
FIG. 3 is a sectional view taken along A-A of FIG. 2.
Figure 4A:
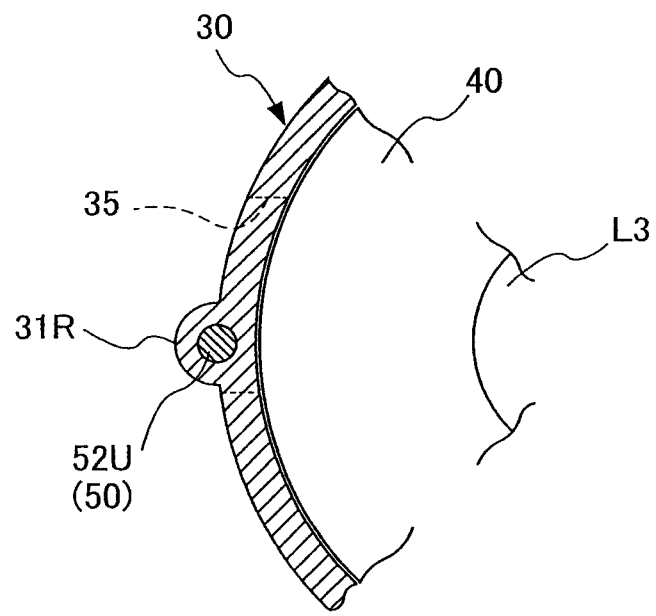
FIG. 4A is a sectional view taken along B-B of FIG. 2.
Figure 4B:
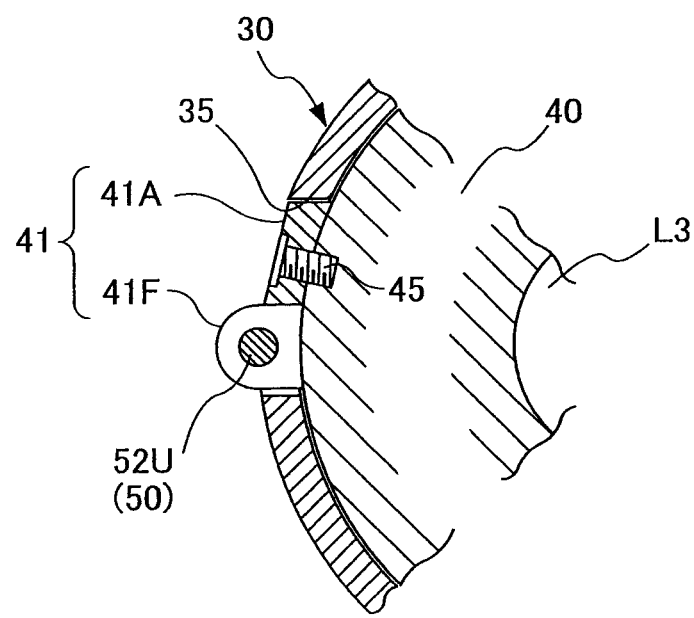
FIG. 4B is a sectional view taken along C-C of FIG. 2.

FIG. 2 is a plan view of the lens interior tube 30. FIG. 3 is a sectional view taken along A-A of FIG. 2, illustrating a cross-section of the lens interior tube 30 taken in a direction along the optical axis OA. FIG. 4A and FIG. 4B are figures illustrating cross-sections of the lens interior tube 30 taken in a direction orthogonal to the optical axis OA.

FIG. 4A is a sectional view taken along B-B of FIG. 2 and FIG. 4B is a sectional view taken along C-C of FIG. 2.

The guide member 50 is structured by an annular support link 51 (see FIG. 1) and two guide bars 52 (52U and 52L), which are fixed to the support link 51.

The guide bars 52 have round rod shapes with predetermined diameters, and are formed of a material with stiffness, such as a stainless steel alloy or the like. One end of each of the two guide bars 52 (52U and 52L) is fixed to the support link 51. The two guide bars 52 (52U and 52L) are disposed at two positions on the same circumference of the support link 51, halfway apart in the circumferential direction (that is, positions separated by 180°).

The support link 51 is interposed between the fixed barrel 25 and the lens mount LM, and the guide member 50 is integrally fixed to the fixed barrel 25. Thus, the two guide bars 52 (52U and 52L) are each provided to be parallel with the optical axis OA between the inner peripheral face of the fixed barrel 25 and the outer peripheral face of the lens interior tube 30. The guide bars 52 have lengths that extend, over the whole of the length direction of the fixed barrel 25, and distal ends thereof fit into object side end portions of the fixed barrel 25.

The lens interior tube 30 has a cylindrical tube shape with a predetermined radial thickness and is formed of a metal or plastic or the like. As mentioned above, the second lens unit L2 is mounted at the front face end of the lens interior tube 30 and the fourth lens unit L4 is mounted at the rear face end. The third unit barrel 40 is provided inside the lens interior tube 30 to be movable in the optical axis OA direction.

Although detailed structure is not illustrated here, the lens interior tube 30 is formed to be divided in the optical axis OA direction, and the third unit barrel 40 is accommodated thereinside and assembled integrally therewith.

Respective pairs of front and rear slide bearing portions 31F and 31R are provided protruding from the outer peripheral face of the lens interior tube 30 at positions that correspond with the two guide bars 52 (52U and 52L). Guide aperture portions 35 and 36 for operations to guide the third unit barrel 40, which will be described later, are formed as apertures at predetermined positions of the lens interior tube 30.

While the slide bearing portions 31F are provided in the vicinity of a front face side end portion of the lens interior tube 30, the slide bearing portions 31R are provided in the vicinity of a rear face side end portion of the lens interior tube 30. That is, the slide bearing portions 31F and the slide bearing portions 31R are disposed at predetermined spacings in the optical axis OA direction.

The slide bearing portions 31F and 31R are formed with predetermined thicknesses in the optical axis OA direction and are provided with bearing holes, into which the guide bars 52 fit into a predetermined mating tolerance to be slidably movable.

The slide bearing portions 31F and 31R fit into the guide bars 52. Thus, the lens interior tube 30 moves along the guide bars 52 inside the fixed barrel 25. That is, the lens interior tube 30 is provided so as to be guided by the guide bars 52 and move in the optical axis OA direction, which is the direction of extension of the guide bars 52, without rotating.

A portion of the fixed barrel 25 that corresponds with a region of movement of the slide bearing portions 31F and 31R in association with movement of the lens interior tube 30 is opened up so as not to obstruct movement of the slide bearing portions 31F and 31R. In the present embodiment, a central position of each guide bar 52 substantially coincides with the outer peripheral face of the lens interior tube 30. Accordingly, recess portions whose cross-sectional shapes are circular arcs corresponding with the peripheral surfaces of the guide bars 52 are formed in the portions of the outer periphery of the lens interior tube 30 at which the guide bars 52 are disposed. Therefore, the circular arc recess portions are also guided by the guide bars 52, contributing to even more stable movement of the lens interior tube 30.

As described hereabove, movement of the lens interior tube 30 is implemented via the cam barrel 24, which is driven to rotate by a rotating operation of the zoom control ring 22. That is, although not illustrated in detail, a structure is formed such that a cam follower protruding from the outer peripheral face of the lens interior tube 30 mates with a cam groove formed in the cam barrel 24, and a position of the cam groove with which the cam follower mates is displaced in the optical axis OA direction by rotating of the cam barrel 24. Thus, the cam follower is operated to move in the optical axis OA direction by rotating of the cam barrel 24, and the lens interior tube 30 moves in the optical axis OA direction.

The third unit barrel 40 that retains the third lens unit L3 as mentioned earlier is disposed inside the lens interior tube 30.

The third unit barrel 40 has a circular disc shape with a predetermined thickness, and is provided, at the outer periphery thereof, with respective slide blocks 41 and 42 at outer periphery portions that correspond with the two guide bars 52 (52U and 52L).

The slide block 41, which corresponds with the guide bar 52U that is disposed at the upper side in FIG. 3, is provided with respective bearings 41F and 41R, at two optical axis OA direction end portions of a mounting baseplate 41A.

As shown in FIG. 3, the mounting baseplate 41A of the slide block 41 is formed as a plate whose plan view shape is substantially rectangular and whose thickness is less than the radial thickness of the lens interior tube 30. The face at the inner periphery side of the mounting baseplate 41A (the side that opposes the outer peripheral face of the third unit barrel 40) has a circular arc form that corresponds with the outer peripheral face of the third unit barrel 40.

The bearings 41F and 41R of the slide block 41 are provided protruding from the mounting baseplate 41A to the periphery direction (upward in FIG. 3) and outer periphery direction (leftward in FIG. 4B). The two bearings 41F and 41R are formed with predetermined thicknesses in the optical axis OA direction, and are provided with bearing holes with which the guide bar 52U mates with a predetermined mating tolerance to be slidably movable.

One of the two bearings, the bearing 41F, is disposed at an edge portion at the forward side of the mounting baseplate 41A, and the other of the two bearings, the bearing 41R, is disposed at an edge portion at the rearward side of the mounting baseplate 41A. Thus, the two bearings 41F and 41R are disposed to be separated by a predetermined spacing in the optical axis OA direction. This spacing of the two bearings 41F and 41R is set such that the third unit barrel 40 can move stably along the guide bar 52U.

The slide block 41 is fixed to the outer peripheral face of the third unit barrel 40 by a screw 45 that penetrates through the mounting baseplate 41A. The slide block 41 that is mounted to the third unit barrel 40 is disposed inside the guide aperture portion 35 of the lens interior tube 30. The bearings 41F and 41R of the slide block 41 protrude to the outer side beyond the outer peripheral face of the lens interior tube 30 and fit into the guide bar 52U.

The slide block 42, which corresponds with the guide bar 52L disposed at the lower side in FIG. 3, is provided with a single bearing 42B. The bearing 42B is formed with a predetermined thickness in the optical axis OA direction, and is provided with a bearing hole with which the guide bar 52L mates with a predetermined mating tolerance to be slidably movable.

The slide block 42 is fixed to the outer peripheral face of the third unit barrel 40 by a screw 46. The bearing 42B protrudes from the guide aperture portion 36 of the lens interior tube 30 to the outer side beyond the outer peripheral face of the lens interior tube 30, and mates with the guide bar 52L.

Thus, a structure is formed in which the slide block 41 is fixed to the outer peripheral face of the third unit barrel 40 by the screw 45 and the slide block 42 is fixed to the outer peripheral face of the third unit barrel 40 by the screw 46. Because of this structure, even in a nesting guide bar type, the slide blocks 41 and 42 may be easily assembled to the third unit barrel 40.

As mentioned earlier, the guide aperture portions 35 and 36 are formed in portions of the lens interior tube 30 that correspond with the slide blocks 41 and 42 of the third unit barrel 40.

As illustrated in FIG. 3, the guide aperture portions 35 and 36 are formed with sizes and shapes that accommodate the slide blocks 41 and 42 and allow movement of the slide blocks 41 and 42 in association with movement of the third unit barrel 40.

FIG. 3, FIG. 4A and FIG. 4B illustrate a state in which the third unit barrel 40 (the third lens unit L3) is disposed closest to the forward face side (object side) relative to the lens interior tube 30 (the second lens unit L2 and the fourth lens unit L4). This is the state of the present embodiment at the tele side end (the side at which the focusing distance is long). From this state, the wide-angle side is reached by the third unit barrel 40 (the third lens unit L3) moving to the rear face side (the camera body 10 side, which is the right side in FIG. 3 and FIG. 4. The guide aperture portions 35 and 36 have shapes that enable the slide blocks 41 and 42 to move to prescribed wide-angle side ends. That is, the movement ranges of the slide blocks 41 and 42 are regulated by the sizes of the guide aperture portions 35 and 36 in the optical axis OA direction.

The slide blocks 41 and 42 provided at the third unit barrel 40 are positioned, respectively, inside the guide aperture portions 35 and 36 of the lens interior tube 30.

The bearings 41F and 41R of the slide block 41 protrude to the outer side of the lens interior tube 30 through the guide aperture portion 35 and fit into the guide bar 52U, and the bearing 42B of the slide block 42 protrudes to the outer side of the lens interior tube 30 through the guide aperture portion 36 and mates with the guide bar 52L.

Thus, the third unit barrel 40 is movable along the guide bars 52 inside the lens interior tube 30. That is, the third unit barrel 40 is formed so as to be guided by the guide bars 52 and moved in the optical axis OA direction, which is the direction of extension of the guide bars 52, without rotating.

Similarly to the movement of the lens interior tube 30 described above, the movement of the third unit barrel 40 is implemented by the cam barrel 24 being driven to rotate via the zoom control ring 22. That is, the cam follower protruding from the outer peripheral face of the third unit barrel 40 mates with the cam groove formed in the cam barrel 24, and a position of the cam groove with which the cam follower mates is displaced in the optical axis OA direction by rotating of the cam barrel 24. Thus, the cam follower is operated to move in the optical axis OA direction by rotating of the cam barrel 24, and the third unit barrel 40 moves in the optical axis OA direction. This movement of the third unit barrel 40 differs from the movement of the lens interior tube 30 that is operated by the same cam barrel 24.

In the movement structure of the lens interior tube 30 and third unit barrel 40 structured as described hereabove, the lens interior tube 30 (the second lens unit L2 and the fourth lens unit L4) and the third unit barrel 40 (the third lens unit L3) are guided by the single guide member 50 (the guide bars 52) and moved by rotating of the cam barrel 24 in association with a rotating operation of the zoom control ring 22. Here, the lens interior tube 30 and the third unit barrel 40 move respectively independently. Thus, the lens interior tube 30 and the third unit barrel 40 which perform respectively different movements are guided to move by the same guide member 50.

Therefore, according to this first embodiment, portions that require precision are greatly reduced in number compared to a structure in which structures that guide movements of the lens interior tube 30 and third unit barrel 40 are respectively separately provided. Thus, it is easy to keep inclinations and positions (tilts and shifts) of the lenses (the second lens unit L2, the third lens unit L3 and the fourth lens unit L4) within design tolerance ranges. Further, not only may construction be simplified; the profile of the imaging lens 20 may be both reduced in diameter and structured with high stiffness. That is, the nesting guide bar type imaging lens 20 may be provided that, while being a simple structure, has small size and high stiffness with high precision.

Second Embodiment

Figure 5:
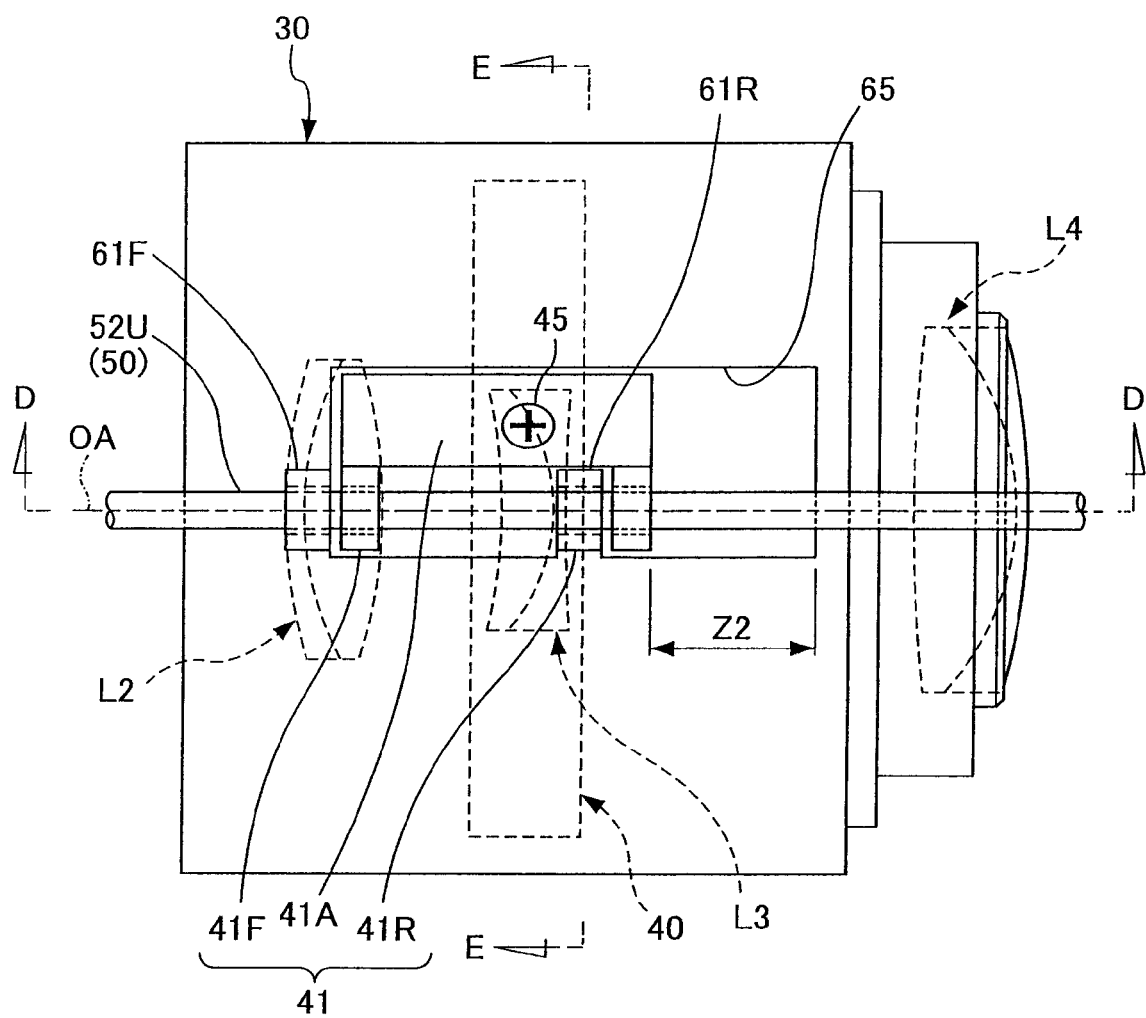
FIG. 5 is a plan view of a lens interior tube relating to a second embodiment.
Figure 6:
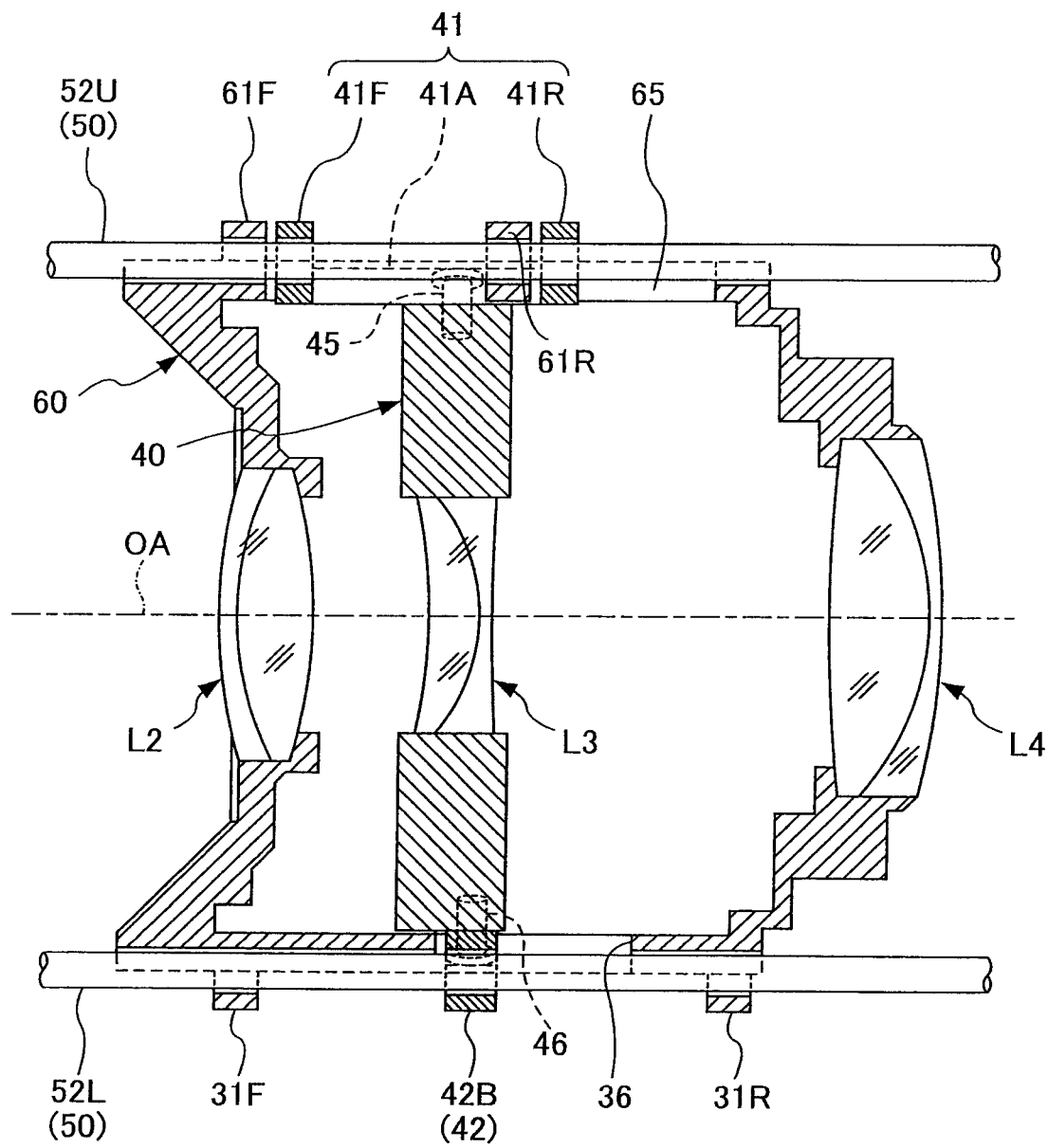
FIG. 6 is a sectional view taken along D-D of FIG. 5.
Figure 7:
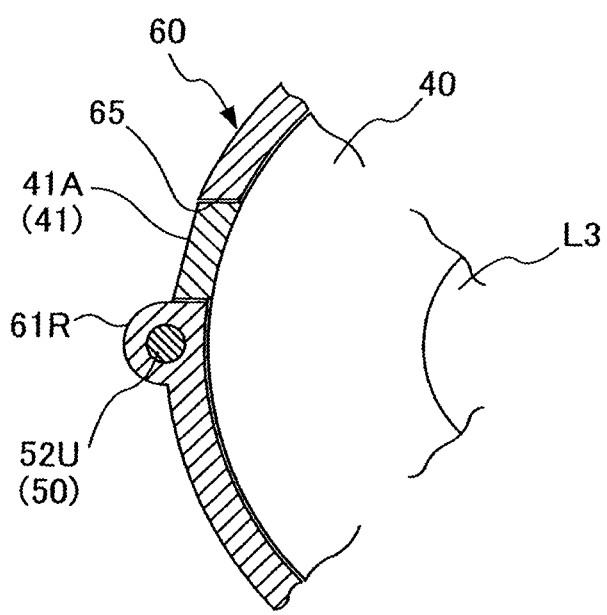
FIG. 7 is a sectional view taken along E-E of FIG. 5.

Next, a second embodiment of the present invention is described referring to FIG. 5 to FIG. 7. FIG. 5 is a plan view of a lens interior tube 60 relating to the second embodiment of the present invention. FIG. 6 is a sectional view taken along D-D of FIG. 5, illustrating a cross-section of the lens interior tube 60 taken in a direction along the optical axis OA. FIG. 7 is a sectional view taken along E-E of FIG. 5, illustrating a cross-section of the lens interior tube 60 taken in a direction orthogonal to the optical axis OA.

In this second embodiment, positions of slide bearing portions 61F and 61R of the lens interior tube 60 differ from the above-described first embodiment. The basic structure is the same as in the above-described first embodiment. Common portions are assigned the same reference numerals and are not described.

The second lens unit L2 and the fourth lens unit L4 are mounted to the lens interior tube 60. Inside the lens interior tube 60, the third unit barrel 40 that retains the third lens unit L3 is provided to be movable in the optical axis direction.

The lens interior tube 60 is provided with the slide bearing portions 61F and 61R, which fit into the guide bar 52. Thus, the lens interior tube 60 is guided by the guide bar 52 and moved in the optical axis OA direction.

A guide aperture portion 65 is formed as an aperture in the lens interior tube 60.

The bearings 41F and 41R of the slide block 41 that are fixed to the third unit barrel 40 protrude to the outer periphery side of the lens interior tube 60 through the guide aperture portion 65 and fit into the guide bar 52. Thus, the third unit barrel 40 is guided by the guide bars 52 and moves in the optical axis OA direction.

The slide bearing portions 61F and 61R that are provided at the lens interior tube 60 are provided at two positions which are separated by a predetermined spacing in the direction of extension of the guide bars 52 (the optical axis OA direction).

The slide bearing portion 61F is disposed at an aperture edge at the front face side of the guide aperture portion 65. Meanwhile, the slide bearing portion 61R is formed to protrude to the aperture interior of the guide aperture portion 65 from the aperture edge that is at the lower side of the guide aperture portion 65 in FIG. 5. Thus, the slide bearing portion 61R is disposed between the bearings 41F and 41R at the front and rear of the slide block 41 of the third unit barrel 40. That is, a structure is formed in which the pair of slide bearing portions 61F and 61R of the lens interior tube 60 and the pair of bearings 41F and 41R of the slide block 41 of the third unit barrel 40 are alternatingly disposed.

As shown in FIG. 5 and FIG. 6, the position of arrangement of the rear face side slide bearing portion 61R is set so as to be adjacent to the front face side of the rear face side 41B of the slide block 41 in the state in which the third unit barrel 40 is disposed furthest to the forward face side relative to the lens interior tube 60 (the tele side).

According to the structural arrangement of the slide bearing portions 61F and 61R of the lens interior tube 60 in this second embodiment, a slide bearing portion is not disposed at an aperture edge portion at the rear face side of the guide aperture portion 65. Therefore, the aperture edge at the rear face side of the guide aperture portion 65 may be set to be close to a rear face side end portion of the lens interior tube 60. As a result, the range of movement of the slide block 41 (the range of movement of the third unit barrel 40) may be increased. That is, relative to a movable distance X1 of the slide block 41 (the third unit barrel 40) of the above-described first embodiment shown in FIG. 2, a movable distance X2 of this second embodiment shown in FIG. 5 may be set to be larger (x1<x2), all conditions other than the positions of arrangement of the slide bearing portions 61F and 61R being equal.

That is, if the movement stroke of the third unit barrel 40 (the third lens unit L3) is made larger in the structure of the first embodiment described above, the spacing of the bearings 41F and 41R of the slide block 41 has to be made narrower. As a consequence, smooth movement of the third unit barrel 40 might be impaired. In contrast, in the structure of this second embodiment, the stroke of the third unit barrel 40 may be increased without reducing the spacing of the bearings 41F and 41R of the slide block 41 (without impairing smooth movement).

Third Embodiment

Figure 8A:
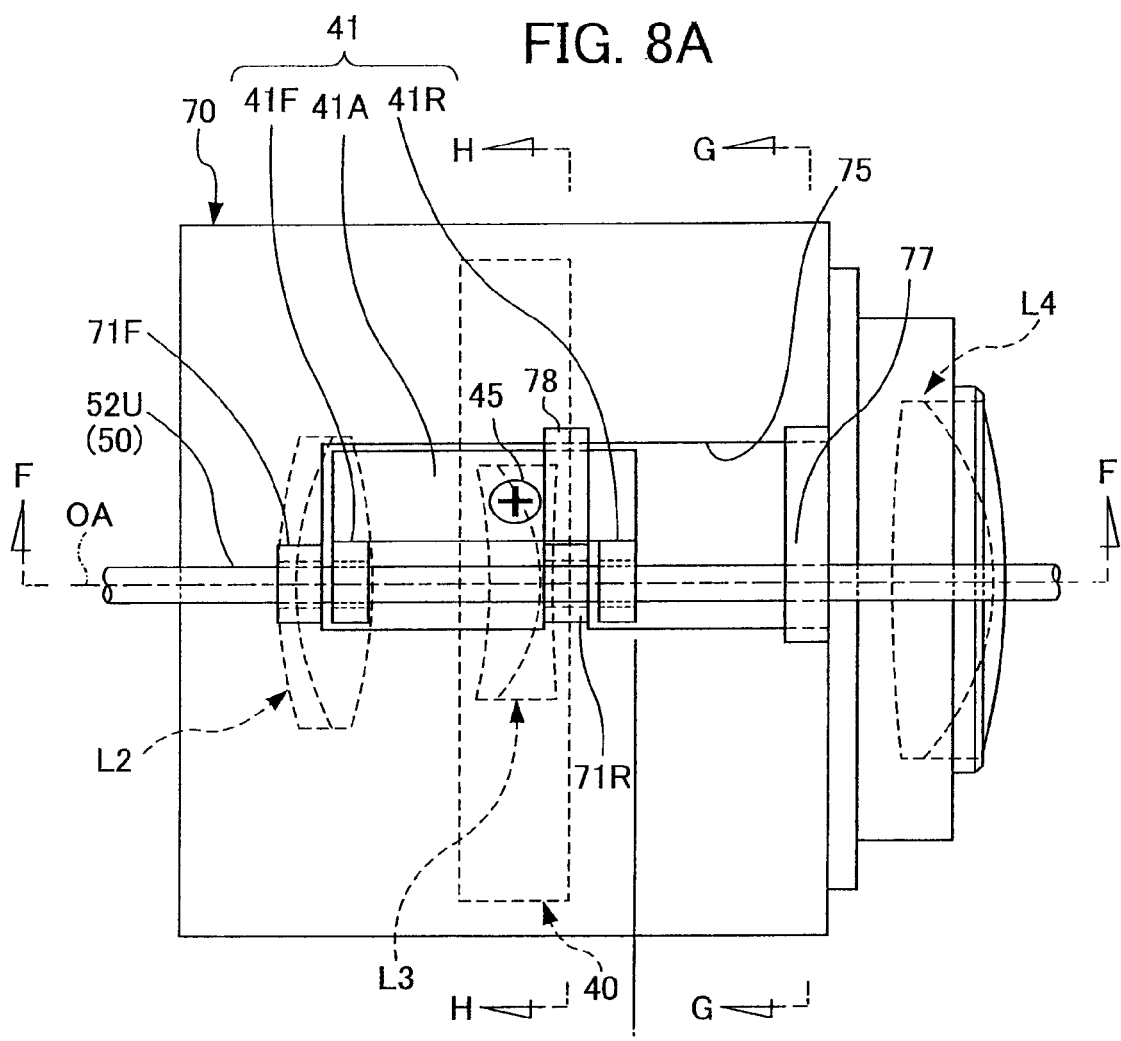
FIG. 8A is plan views of a lens interior tube relating to a third embodiment and being a view illustrating a state in which a third unit barrel 40 is at a tele side.
Figure 8B:
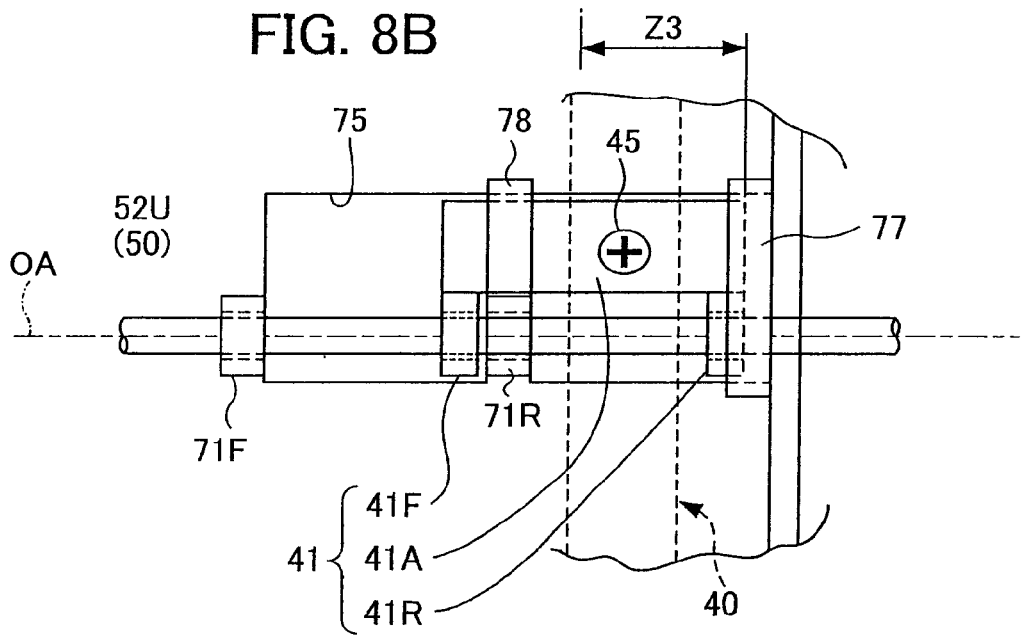
FIG. 8B is plan views of a lens interior tube relating to a third embodiment and being a view illustrating a state in which the third unit barrel 40 is moved to a wide-angle side.
Figure 9:
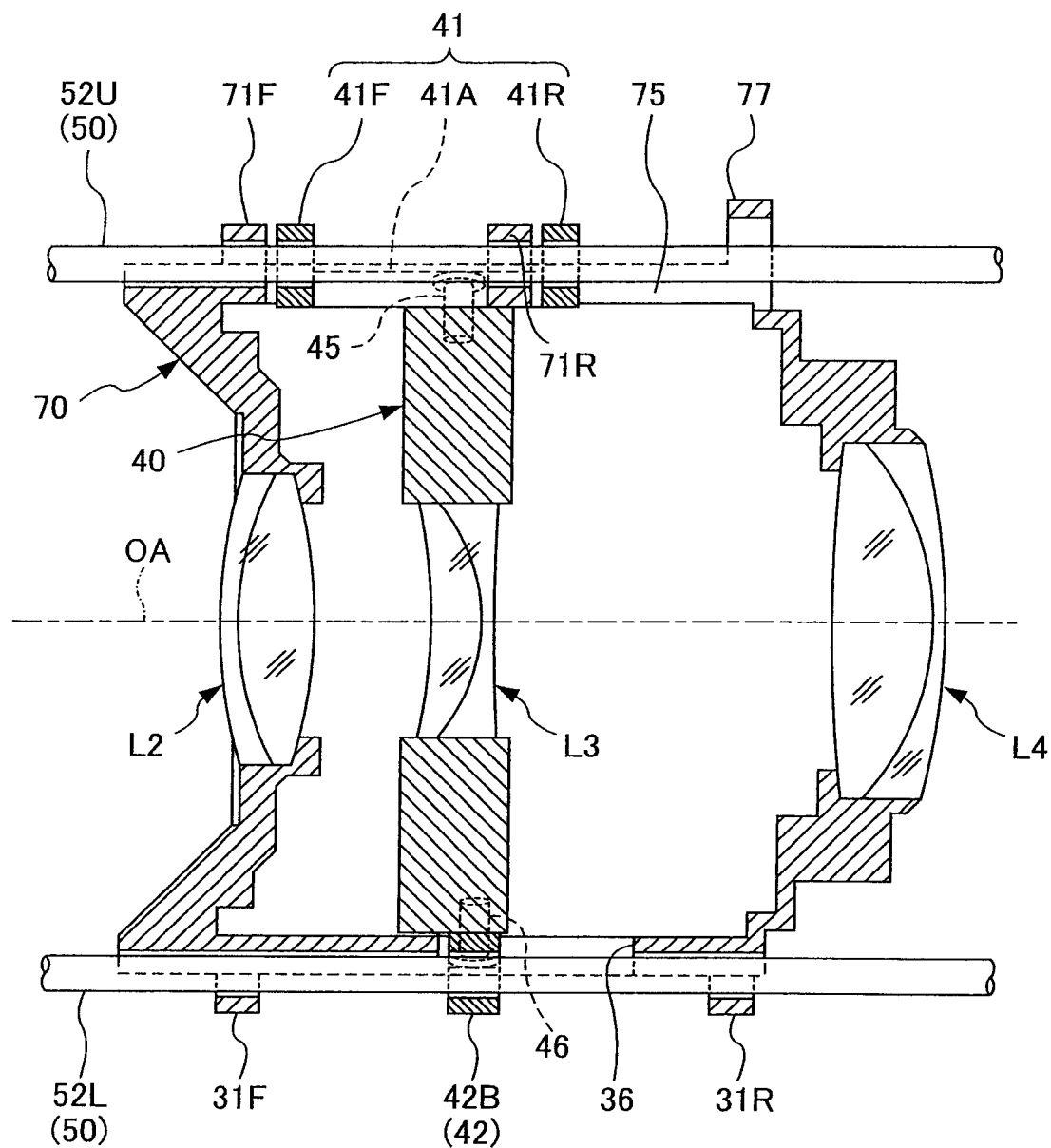
FIG. 9 is a sectional view taken along F-F of FIG. 8.

Next, a third embodiment of the present invention is described referring to FIG. 8 to FIG. 10.

Figure 10A:
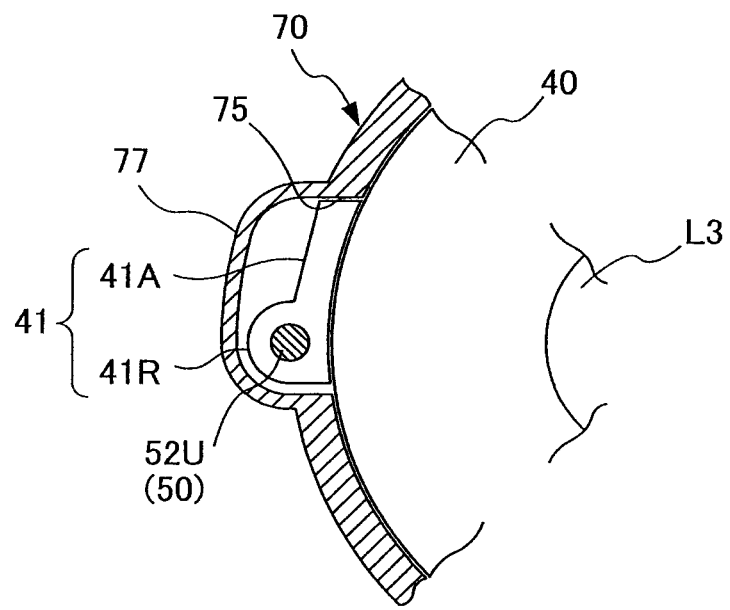
FIG. 10A is a sectional view taken along G-G of FIG. 8.
Figure 10B:
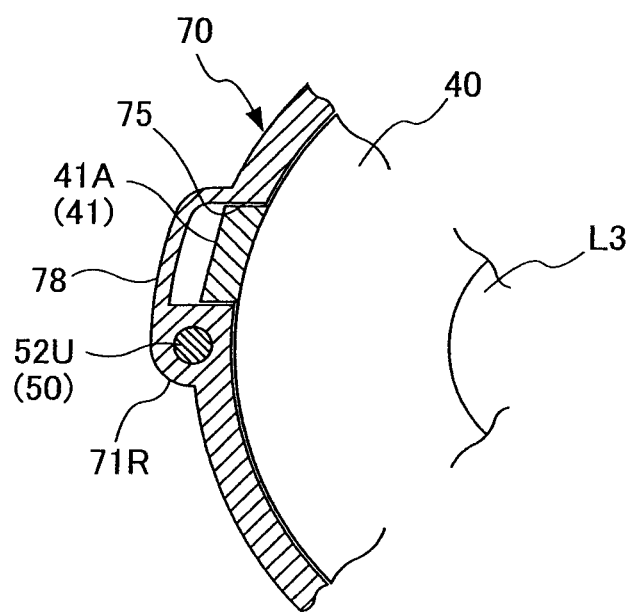
FIG. 10B is a sectional view taken along H-H of FIG. 8.

FIG. 8 is plan views of a lens interior tube 70 relating to the third embodiment of the present invention, FIG. 8A being a view illustrating the state in which the third unit barrel 40 is at the tele side and FIG. 8B being a view illustrating the state in which the third unit barrel 40 is moved to the wide-angle side. FIG. 9 is a sectional view taken along F-F of FIG. 8, illustrating a cross-section of the lens interior tube 70 taken in a direction along the optical axis OA. FIG. 10 illustrates cross-sections of the lens interior tube 70 taken in directions orthogonal to the optical axis OA, FIG. 10A being a sectional view taken along G-G of FIG. 8 and FIG. 10B being a sectional view taken along H-H of FIG. 8.

In this third embodiment, structure of a guide aperture portion 75 differs from the above-described second embodiment. The basic structure is the same as in the above-described first embodiment and second embodiment. Common portions are assigned the same reference numerals and are not described.

The second lens unit L2 and the fourth lens unit L4 are mounted to the lens interior tube 70. Inside the lens interior tube 70, the third unit barrel 40 that retains the third lens unit L3 is provided to be movable in the optical axis direction.

The lens interior tube 70 is provided with slide bearing portions 71F and 71R, which fit into the guide bar 52. Thus, the lens interior tube 70 is guided by the guide bar 52 and moved in the optical axis OA direction.

The guide aperture portion 75 is formed as an aperture in the lens interior tube 70. A wall face corresponding with the guide aperture portion 75 at the rear face side of the lens interior tube 70 is cut away in a shape that does not interfere with the slide block 41 fixed to the third unit barrel 40. Accordingly, the guide aperture portion 75 opens out at the rear face side of the lens interior tube 70.

At the end portion of the lens interior tube 70 at which the guide aperture portion 75 opens out, an end portion bridging portion 77 is provided to span the guide aperture portion 75.

The end portion bridging portion 77 is in a plate shape with a predetermined thickness, which has a predetermined width in the optical axis OA direction, and connects between circumferential direction edges of the guide aperture portion 75. As illustrated in FIG. 10A, the end portion bridging portion 77 forms a shape that bulges to the outer periphery side. Thus, the end portion bridging portion 77 is formed to be able to accommodate the slide block 41 at the inner periphery side thereof without interfering with the bearing 41R of the slide block 41. Furthermore, the end portion bridging portion 77 prevents a reduction in stiffness of the lens interior tube 70 due to the guide aperture portion 75 opening out at the rear face side.

The bearings 41F and 41R of the slide block 41 fixed to the third unit barrel 40 protrude to the outer periphery side of the lens interior tube 70 from the guide aperture portion 75, and fit into the guide bar 52. Thus, the third unit barrel 40 is guided by the guide bars 52 and moves in the optical axis OA direction.

The slide bearing portions 71F and 71R that are provided at the lens interior tube 70 are provided at two positions which are separated by a predetermined spacing in the direction of extension of the guide bars 52 (the optical axis OA direction).

The slide bearing portion 71F is disposed at the aperture edge at the front face side of the guide aperture portion 75. Meanwhile, the slide bearing portion 71R is formed to protrude to the aperture interior of the guide aperture portion 75 from the aperture edge that is at the lower side of the guide aperture portion 75 in FIG. 8. Thus, the slide bearing portion 71R is provided between the bearings 41F and 41R at the front and rear of the slide block 41 of the third unit barrel 40. That is, a structure is formed in which the pair of slide bearing portions 71F and 71R of the lens interior tube 70 and the pair of bearings 41F and 41R of the slide block 41 of the third unit barrel 40 are alternatingly disposed.

As shown in FIG. 10B, a central bridging portion 78 is provided spanning the guide aperture portion 75 at the portion of the lens interior tube 70 at which the slide bearing portion 71R is formed.

The central bridging portion 78 is formed in a plate shape with a width equal to the slide bearing portion 71R and a predetermined thickness, and connects between the outer peripheral end of the slide bearing portion 71R and an edge of the guide aperture portion 75. Similarly to the above-described end portion bridging portion 77, the central bridging portion 78 prevents a reduction in stiffness of the lens interior tube 70 due to the opening of the guide aperture portion 75.

According to this third embodiment, the guide aperture portion 75 formed in the lens interior tube 70 opens out at the rear face side of the lens interior tube 70. Therefore, the range of movement of the slide block 41 (the range of movement of the third unit barrel 40) can be increased. That is, a movable distance X3 to the wide-angle side in this third embodiment shown in FIG. 8 may be set to be larger than the movable distance X1 to the wide-angle side of the above-described first embodiment shown in FIG. 3 and the movable distance X2 to the wide-angle side of the second embodiment shown in FIG. 5 (X1<X2<X3).

Moreover, a reduction in stiffness of the lens interior tube 70 due to the guide aperture portion 75 opening out at the rear end side is prevented by the end portion bridging portion 77 and the central bridging portion 78.

According to the first embodiment to third embodiment described hereabove, the following effects are common thereto.

(1) The relatively moving lens interior tube 30 and third unit barrel 40 are guided by the same guide member 50. Therefore, in comparison to a structure in which structures that guide movements of the lens interior tube 30 and the third unit barrel 40 are respectively separately provided, portions requiring precision may be greatly reduced in number. Thus, it is easier to keep tilts and shifts of the lenses within design tolerance ranges.

(2) Further, not only can construction be simplified but the profile of the imaging lens 20 can be both reduced in diameter and stiffly structured. That is, the nesting guide bar type imaging lens 20 may be provided that, while being a simple structure, has small size and high stiffness with high precision.

(3) The slide blocks 41 and 42 may be easily assembled to the third unit barrel 40, by fixing the slide block 41 to the outer peripheral face of the third unit barrel 40 with the screw 45 and fixing the slide block 42 to the outer peripheral face of the third unit barrel 40 with the screw 46.

Modification

The embodiments described above are not to be limiting. Various modifications and alterations as follows are possible and are also within the technical scope of the present invention.

(1) In the above embodiments, the guide bars 52 of the guide member 50 are exemplified by structures that are disposed at the outer periphery side of the lens interior tube 30. However, the guide bars 52 may be disposed at the inner periphery side of the lens interior tube 30.

FIG. 11 shows a sectional view taken along the optical axis OA direction of the lens interior tube 30 in a structural example in which the guide bars 52 are disposed at the inner periphery side of a lens interior tube 80. The respective portions in FIG. 11 are assigned the same reference numerals as in the first embodiment. In this structure, there is no need to form an aperture portion (the guide aperture portion 35 or the like) in the lens interior tube 80 into which a member that guides movement of the third unit barrel 40 (the bearings 41F and 41R in the above-described first embodiment or the like) protrudes. Therefore, the lens interior tube 80 can be structured with compactness and stiffness.

Figure 12A:
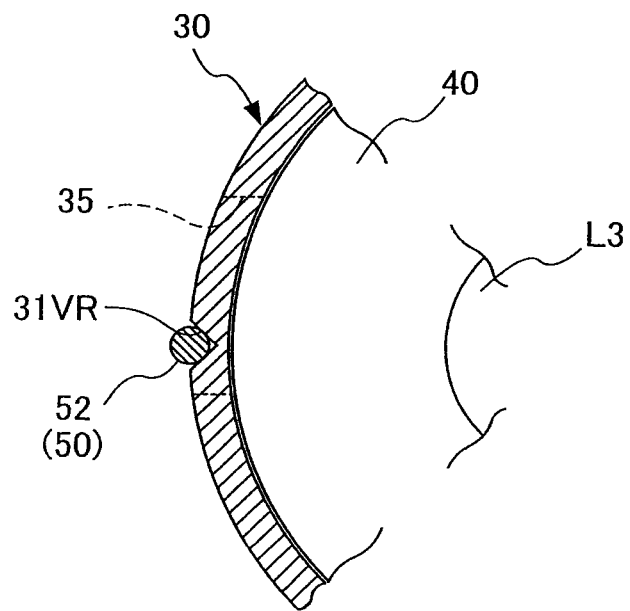
FIG. 12A s a sectional view corresponding to FIG. 4A and FIG. 4B of the first embodiment, illustrating a variant example of the arrangement structure of the guide bars.
Figure 12B:
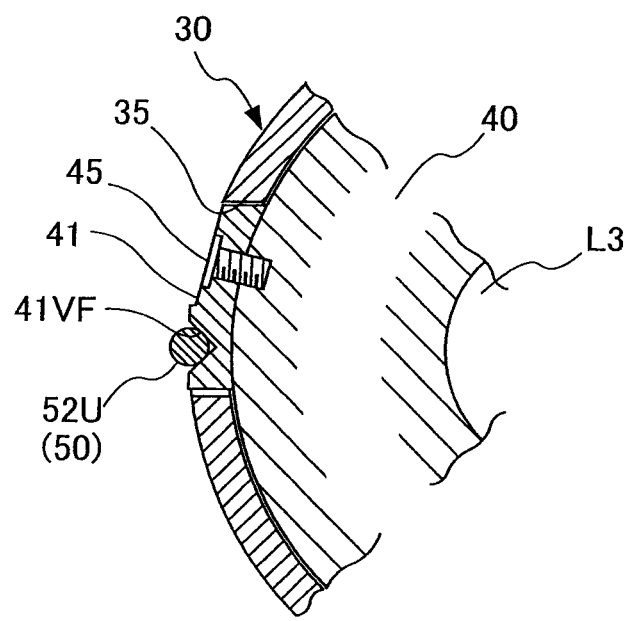
FIG. 12B is a sectional view corresponding to FIG. 4A and FIG. 4B of the first embodiment, illustrating a variant example of the arrangement structure of the guide bars.

(2) Further, in the embodiments described above, structures are described in which the guide bar 52 slidably movably mates with through-holes in the slide bearing portions 31F and 31R, 61F and 61R or 71F and 71R and the bearings 41F and 41R, and the lens interior tube 30, 60 or 70 and the slide block 41 (the third unit barrel 40) move along the guide bar 52. However, the structures that are guided by the guide bars 52 and move do not necessarily have to be holes. For example, as shown in the figures in FIG. 12A and FIG. 12B, which correspond to FIG. 4A and FIG. 4B of the first embodiment, V-shaped bearing grooves 31VR and 41VF are possible. U shapes are also possible. In FIG. 12A and FIG. 12B, the reference numerals of portions apart from the bearing grooves 31VR and 41VF follow FIG. 4A and FIG. 4B.

Figure 13:
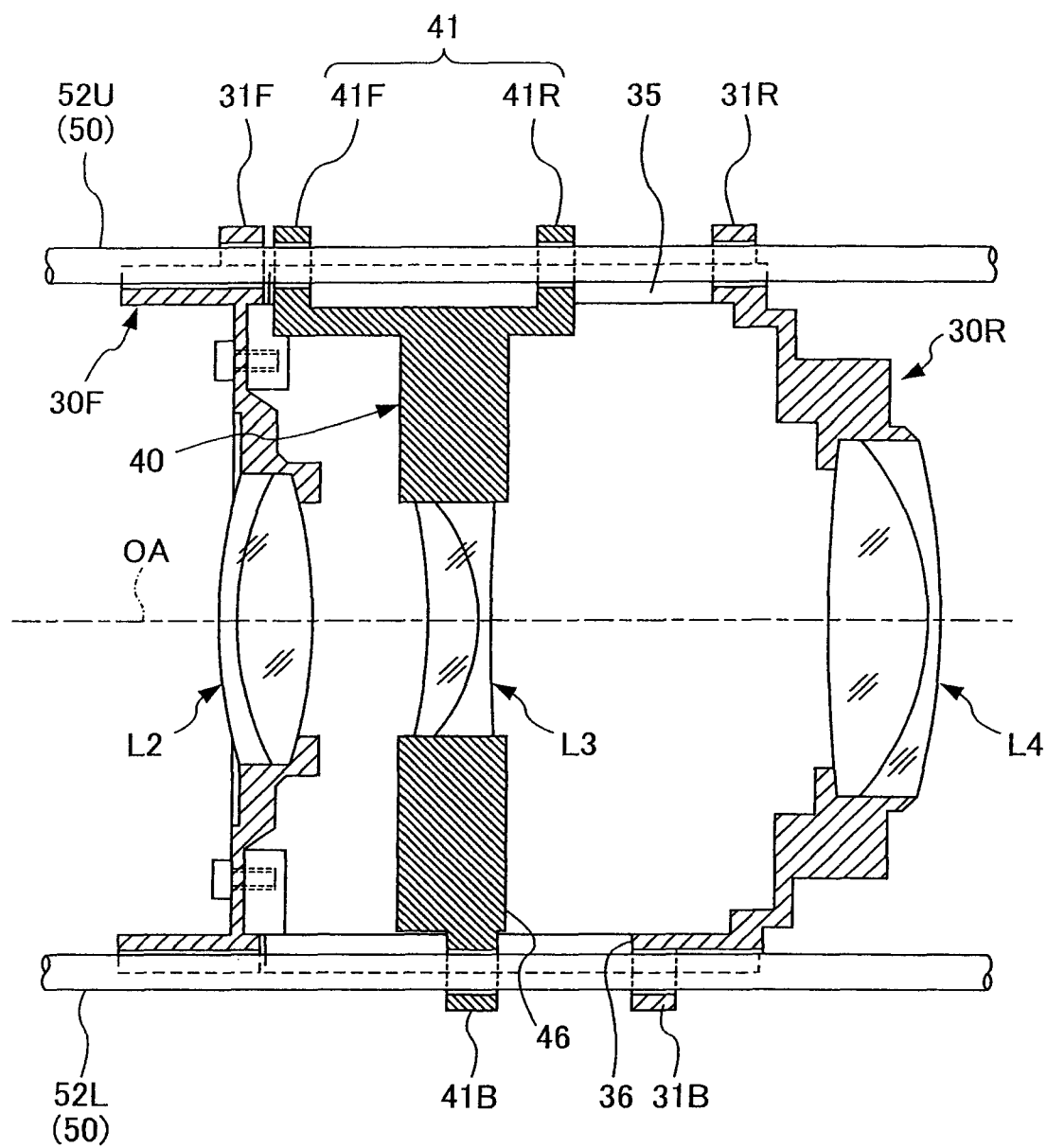
FIG. 13 is a figure showing a modification of the embodiments.

(3) FIG. 13 shows a variant example of the embodiment. A structure feature is similar to the one showing in FIG., therefore, an explanation thereof is omitted. The lens barrel of FIG. 13 is assembled as following.

A lens unit sliding tube 40 is inserted from leftward in the drawing into a rear side lens unit sliding tube 30R that includes a mating portion 31R and an elongated hole portion 31B, after which a front side lens sliding tube 30F that includes a mating portion 31F is mated and attached with a small screw.

At this time, angular positions of the mating portions 31F and 31R are adjusted such that an offset of optical axes of the lens units L2 and L4 is kept within a tolerance range.

Then, the guide bar 52U, of which one end is inserted in and fixed to a fixed tube, is inserted into the mating portions 31F, 31R, 41F and 41R, from the other end thereof. At the same time, the other end of the guide bar 52L is similarly inserted into the elongated hole portions 31B and 41B.

Thus, the illustrated state is achieved (The fixed tube is not illustrated.)

(4) Further, in the embodiments described above, a zoom lens in which the lens interior tube 30, 60 or 70 that retains the second lens unit L2 and fourth lens unit L4 and the third unit barrel 40 that retains the third lens unit L3 relatively move to alter the focusing distance is described as an example. However, the present invention is also applicable to a structure that moves a focusing lens that adjusts focus.

(5) The embodiments and variant examples may be suitably combined and employed, but detailed descriptions are not given here. The present invention is not to be limited by the embodiments described hereabove.

Fourth Embodiment

Figure 14:
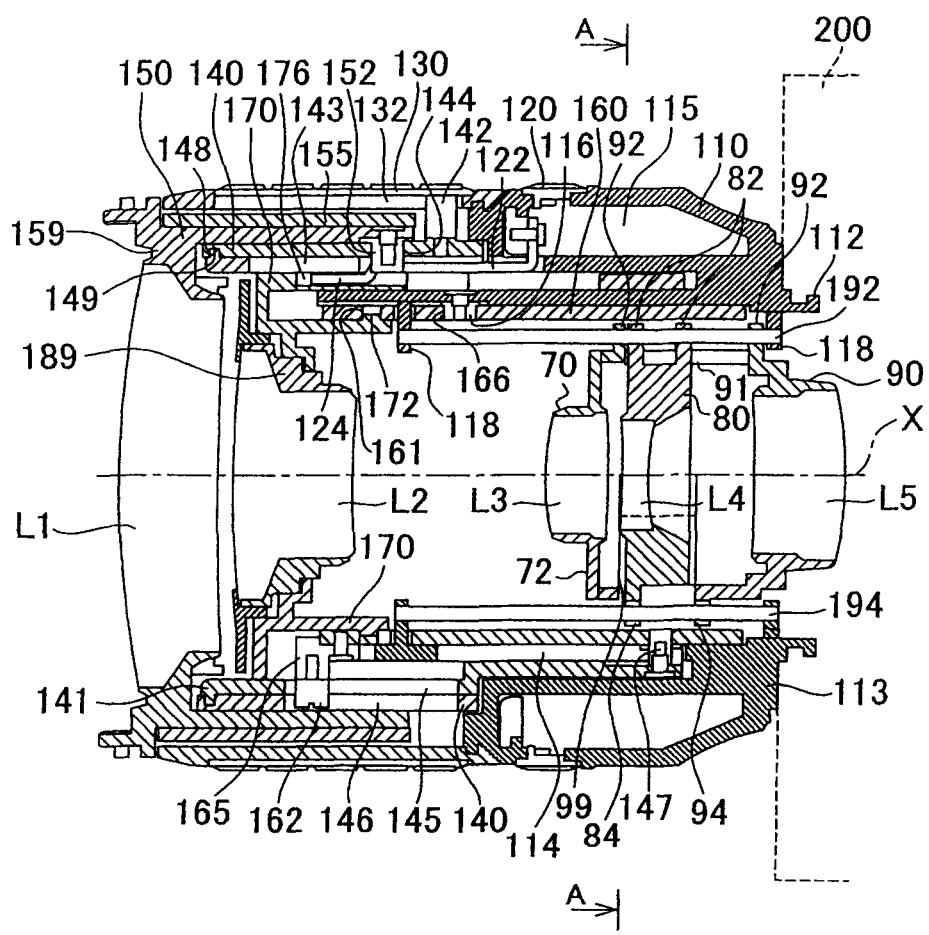
FIG. 14 is a vertical sectional view of the wide-angle end state of a lens barrel.
Figure 15:
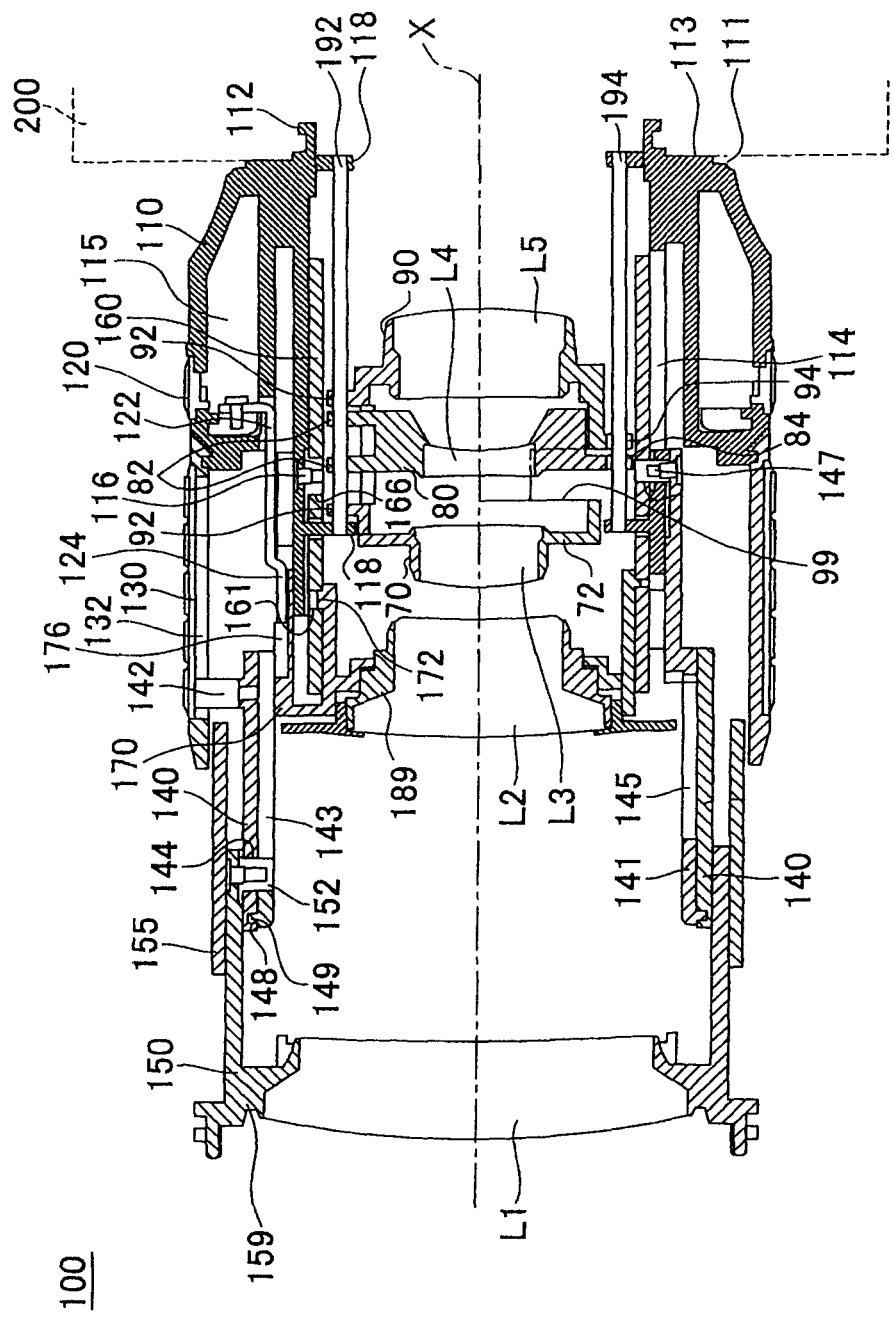
FIG. 15 is a vertical sectional view of the tele end state of the lens barrel.
Figure 16:
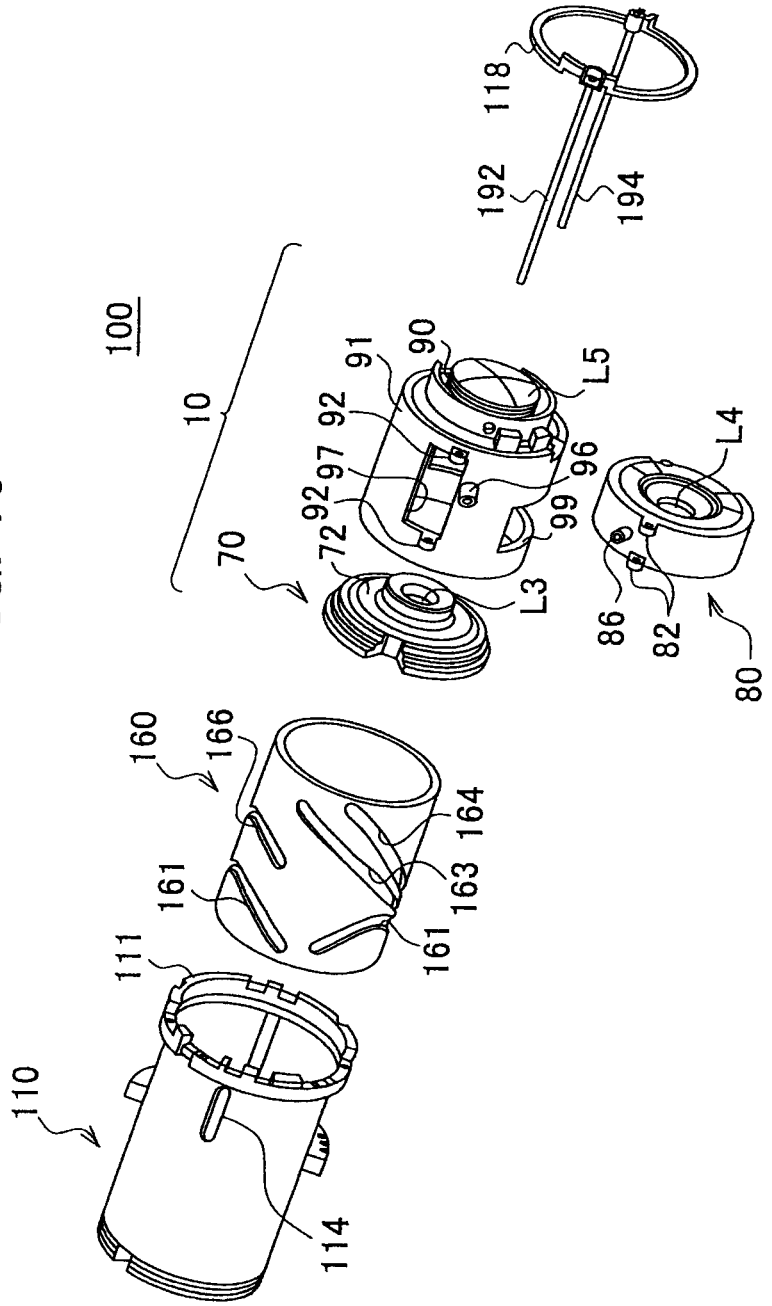
FIG. 16 is an exploded perspective view of a portion of the lens barrel.

FIG. 14 and FIG. 15 are sectional view of a lens barrel 100. FIG. 16 is an exploded perspective view of a portion of the lens barrel 100. The lens barrel 100 is provided with five units of lenses L1, L2, L3, L4 and L5, which are sequentially disposed on a common optical axis X. The lenses L1, L2, L3, L4 and L5 are retained by lens frames 159, 189, 70, 80 and 90, respectively. The lens barrel 100 is a zoom lens. FIG. 14 illustrates the state in which the focusing distance of the lens barrel 100 is at the wide-angle end and FIG. 15 the state in which the focusing distance of the lens barrel 100 is at the tele end.

FIG. 16 illustrates a state in which, from the structure of the lens barrel 100, structure relating to an assembly 10 of the lenses L3, L4 and L5 is exploded.

The lens barrel 100 includes a fixed tube 110, which is fixed to an imaging unit 200 that includes an image sensor or the like. The fixed tube 110 is formed in a tubular shape overall, and includes, at a rear end base portion 111, a mount 112 that is joined to the imaging unit 200. When the lens barrel 100 is joined to the imaging unit 200, a mounting surface 113 at a rear end face of the fixed tube 110 is in surface contact with a front face of the imaging unit 200 and is positioned.

In the following descriptions, unless specifically described, movement in a direction parallel to the optical axis X, referred to the fixed tube 110, is "translation", and rotating about the optical axis X is "rotation". Furthermore, the direction parallel to the optical axis X in the lens barrel 100 is "front-rear", the imaging unit 200 side is the "rear side" (imaging surface side), and the side at the other end is "forward" (the object side).

At the front end side outer periphery of the fixed tube 110, an interior tube 141, a middle tube 140, an outer tube 150 and a zoom ring 130, which are coaxial with one another, are provided in this order from the inner side. At the inner periphery side of the fixed tube 110, a cam barrel 160 is provided to be rotatable and translatable with respect to the fixed tube 110. As the front end of the fixed tube 110, a linking ring 170, which is rotatable and translatable with respect to the fixed tube 110, is provided to span from the inner periphery side of the cam barrel 160 to the outer periphery side of the fixed tube 110.

The zoom ring 130 is attached so as to be operated from the outside and rotate when a zoom ratio change operation is performed. The zoom ring 130 includes, at the inner face thereof, a linear guide groove 132 that extends in the optical axis X direction.

The middle tube 140 includes a cam follower 142, which engages with the guide groove 132 of the zoom ring 130, protruding to the outer periphery side. The inner periphery face of the middle tube 140 includes an engaging groove 148, which guides the interior tube 141, provided around the optical axis X. The peripheral face of the middle tube 140 includes a cam groove 144, which guides the outer tube 150, angled with respect to the optical axis X. The peripheral face of the middle tube 140 also includes a linear groove 146 that guides movement relative to the cam barrel 160. When the zoom ratio is changed, the middle tube 140 is rotated, and the linear groove 146 goes to a position that is not shown in the sectional view in FIG. 14.

The interior tube 141 includes an engaging protrusion 149, which engages with the engaging groove 148 of the middle tube 140, protruding to the outer periphery side. The fixed tube 110 includes a linear elongated hole 114 provided in the optical axis X direction. A cam follower 147 of the interior tube 141 penetrates through the elongated hole 114. The interior tube 141 further includes a linear groove 143 that, working with the cam groove 144 of the middle tube 140, guides the outer tube 150. The interior tube 141 also includes a clearance hole 145 that opposes at least a portion of the linear groove 146 of the middle tube 140.

The outer tube 150 includes a cam follower 152, which engages with the cam groove 144 of the middle tube 140 and the linear groove 143 of the interior tube 141, protruding to the inner periphery side. The front end of the outer tube 150 is joined to the lens frame 159 that retains the lens L1.

The linking ring 170 includes a cam follower 172, which guides movement relative to the cam barrel 160, provided at the inner periphery side of the cam barrel 160. The linking ring 170 also includes a linear groove 176, which guides translation movement of the linking ring 170, provided at the outer periphery side of the fixed tube 110. The linking ring 170 retains, at the inner periphery side thereof, the lens frame 189 that retains the lens L2.

The cam barrel 160 includes cam grooves 161, 163, 164 and 166, which are each provided to be angled with respect to the optical axis X. The cam follower 172 of the linking ring 170 engages with the cam groove 161. In the cam barrel 160, three of the cam grooves 161, with the same shape, are formed to be provided uniformly about the optical axis X. Only the single cam follower 172 is illustrated in FIG. 14 and FIG. 15. However, it is preferable if the cam followers 172 correspond with the number of cam grooves 161. Furthermore, it is preferable if the number of cam grooves 161 is two or three. As will be described hereafter, the cam groove 163 provides translational driving force to the lens L4, and the cam groove 164 provides translational driving force to the lens L3 and the lens L5. A cam pin 116, which is provided at the inner periphery face of the fixed tube 110, engages with the cam groove 166 and provides translational driving force with respect to the fixed tube 110 to the cam barrel 160.

A cam follower 162 that protrudes outward in a radial direction is fixed, via a linking member 165, to the front end of the cam barrel 160. The cam follower 162 penetrates through the clearance hole 145 of the interior tube 141 and engages with the linear groove 146 of the middle tube 140.

A focusing ring 120 is rotatably provided at the outer periphery relative to the rear side of the fixed tube 110. A cavity that constitutes a motor chamber 115 is formed at the inner periphery side of the focusing ring 120. An unillustrated motor is accommodated in the motor chamber 115.

One end of a transmission member 122 is disposed inside the motor chamber 115. A front end portion 124 of the transmission member 122 is disposed in the linear groove 176 of the linking ring 170. The transmission member 122 is selectively driven from either the focusing ring 120 or the motor, and rotates the linking ring 170 along the outer periphery of the fixed tube 110. An outer periphery portion forming the motor chamber 115 is not illustrated in FIG. 16.

Next, a pair of guide bars 192 and 194, which are provided in parallel with the optical axis X, are provided further to the inner periphery side of the cam barrel 160. In the following description, unless specifically described, the guide bar 192 side relative to the optical axis X is the upper side and the guide bar 194 side relative to the optical axis X is the lower side.

One ends of the guide bars 192 and 194 are supported at an annular support portion 118, which is provided at the inner periphery rear end of the fixed tube 110, and the guide bars 192 and 194 are provided symmetrically to one another with respect to the optical axis X. The lens frames 70, 80 and 90 are movably supported by the guide bars 192 and 194.

The lens frames 70 and 90 are joined to one another by a linking tube 91 that extends in the optical axis X direction. The linking tube 91 includes the lens frame 90, which retains the lens L5, at the rear end and the lens frame 70, which retains the lens L3, at the front end.

The lens frame 70 includes a flange portion 72 that both retains an outer edge of the lens L3 and extends in the radial direction of the lens L3. As a result, the lens frame 70 has an outer diameter substantially equal to the outer diameter of the linking tube 91 and may be joined to the front end of the linking tube 91.

Figure 17:
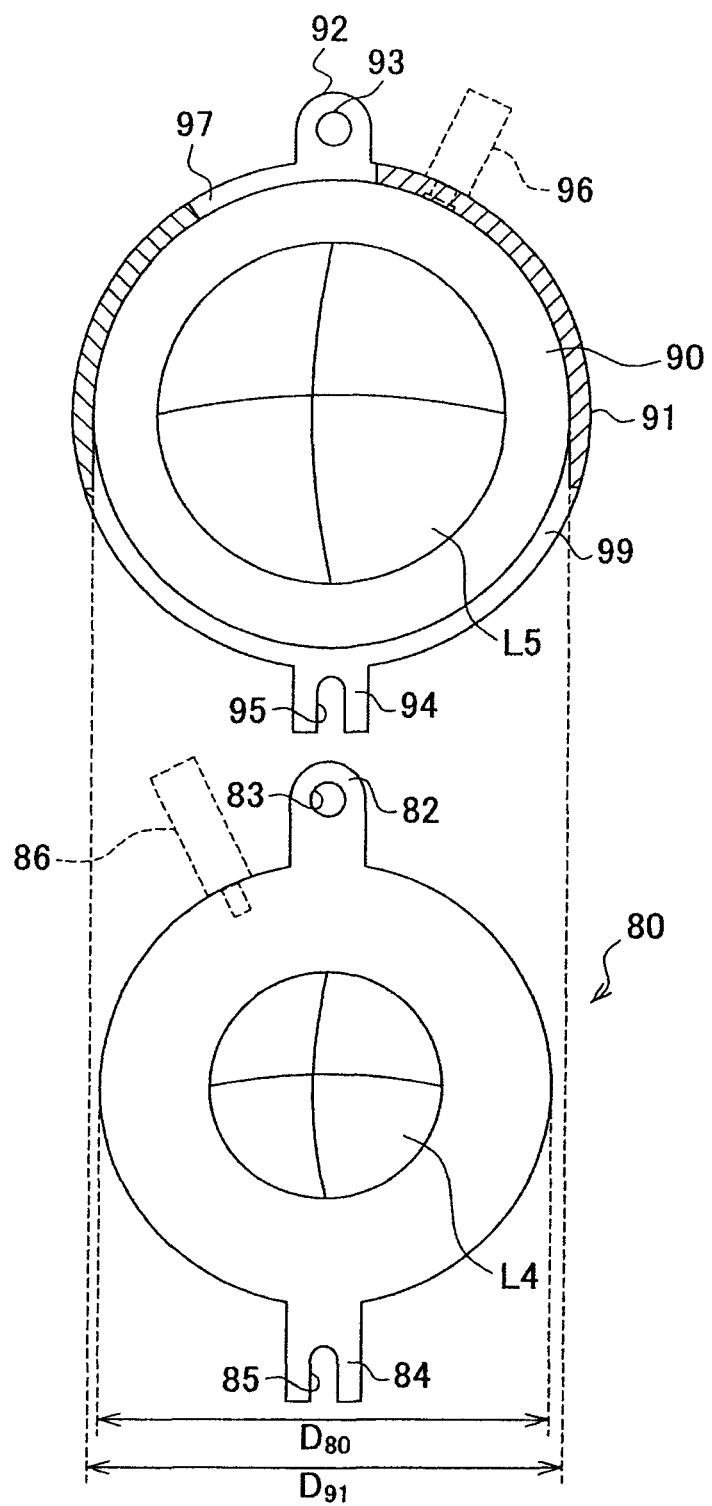
FIG. 17 is a figure illustrating a process of assembly of a lens frame to a linking tube.
Figure 18:
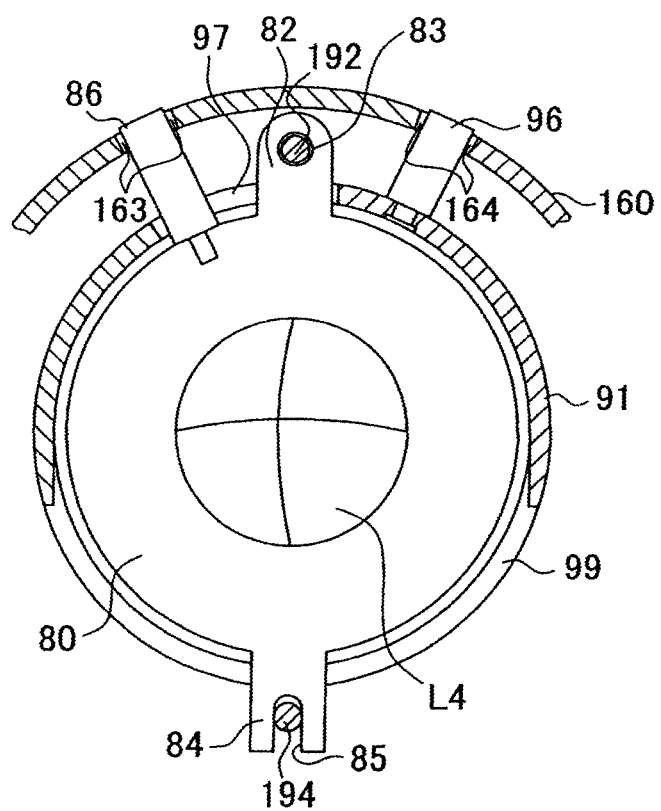
FIG. 18 is a sectional view illustrating the construction of an assembly.

At the inner periphery of the linking tube 91, the lens frame 80, which retains the lens L4, is translateably provided inside the linking tube 91. FIG. 17 is a figure illustrating a process of disposing the lens frame 80 at the inner periphery side of the linking tube 91. FIG. 18 is a figure illustrating a state in which the lens frame 80 is disposed at the inner periphery side of the linking tube 91, being a sectional figure taken along A-A of FIG. 14.

At the outer periphery face, the lens frame 80 includes a pair of mating portions 82 that fit into the guide bar 192 and an engaging portion 84 that engages with the guide bar 194.

Each of the pair of mating portions 82 includes a mating hole 83 in a round hole shape, through which the guide bar 192 can be inserted.

Each mating hole 83 has an inner diameter substantially equal to the outer diameter of the guide bar 192, and the pair of mating portions 82 are translateably movably retained by the guide bar 192. The pair of mating portions 82 are provided at a spacing in the direction of extension of the guide bar 192. Thus, the lens frame 80 is guided while inclination relative to the guide bar 192 is restrained.

The engaging portion 84 includes a U-shaped groove 85 that includes a pair of parallel faces sandwiching the guide bar 194. The lens frame 80 is provided with the mating portions 82 and the engaging portion 84 at the outer periphery side. Thus, the lens frame 80 is restrained from rotating about the guide bar 192.

The lens frame 80 also includes a cam follower 86, which engages with the cam groove 163 of the cam barrel 160, at the outer peripheral surface in the vicinity of the mating portions 82. The cam follower 86 is attached after the linking tube 91 containing the lens frame 80 thereinside has been disposed at the inner side of the cam barrel 160. The cam follower 86 is passed through the cam barrel 160 while engaging with the cam groove 163 of the cam barrel 160, and is mounted to the outer peripheral surface of the lens frame 80.

The linking tube 91 includes a clearance hole 97 that lets the mating portions 82 and the cam follower 86 of the lens frame 80 protrude to the outside and allows relative translation of the mating portions 82 and the cam follower 86. The linking tube 91 further includes, at the lower side peripheral face thereof, an insertion hole 99 through which the lens frame 80 is passed when the lens frame 80 is inserted to the inner peripheral side of the linking tube 91.

The linking tube 91 includes, at the outer peripheral surface thereof, a pair of mating portions 92 that fit into the guide bar 192. Each of the mating portions 92 includes a mating hole 93 in a round hole shape, through which the guide bar 192 can be inserted. Each mating hole 93 has an inner diameter substantially equal to the outer diameter of the guide bar 192, and the pair of mating portions 92 are translateably movably retained by the guide bar 192. The pair of mating portions 92 are provided at a spacing in the direction of extension of the guide bar 192. Thus, the linking tube 91 is guided while inclination relative to the guide bar 192 is restrained.

The linking tube 91 also includes, at the outer peripheral surface, an engaging portion 94 that engages with the guide bar 194. The engaging portion 94 includes a U-shaped groove 95 that includes a pair of parallel faces sandwiching the guide bar 194. The linking tube 91 includes the mating portions 92 and the engaging portion 94 at the outer peripheral surface. Thus, rotation about the guide bar 192 is restrained.

The linking tube 91 also includes a cam follower 96, which engages with the cam groove 164 of the cam barrel 160, at the outer peripheral surface in the vicinity of the mating portions 92. The cam follower 96 is attached after the linking tube 91 has been disposed at the inner side of the cam barrel 160. The cam follower 96 is passed through the cam barrel 160 while engaging with the cam groove 164 of the cam barrel 160, and is mounted to the outer peripheral surface of the linking tube 91.

The pair of mating portions 92 are disposed so as to sandwich the clearance hole 97 in the optical axis X direction at the upper side outer peripheral surface of the linking tube 91. The mating portions 82 of the lens frame 80 protrude from the clearance hole 97. Thus, the mating portions 82 of the lens frame 80 and the mating portions 92 of the linking tube 91 may be disposed in line in the optical axis X direction, and a single guide bar may penetrate through the mating portions 82 and 92.

The engaging portion 94 is formed so as to overlap with a region in which the insertion hole 99 is formed when the linking tube 91 is viewed in the optical axis X direction. The engaging portion 84 of the lens frame 80 protrudes from the insertion hole 99. Thus, the engaging portion 84 of the lens frame 80 and the engaging portion 94 of the linking tube 91 may be disposed in line in the optical axis X direction, and a single guide bar may engage with the engaging portions 84 and 94.

Because of these structures, the lens frames 70 and 90, and the lenses L3 and L5 retained therein, move integrally along the guide bars 192 and 194. Moreover, the lens frame 80 and the lens L4 move along the guide bars 192 and 194 separately from the linking tube 91 at the inner periphery side of the linking tube 91. Furthermore, the cam follower 86 of the lens frame 80 engages with the cam groove 163, which is different from the cam groove 164 with which the cam follower 96 of the linking tube 91 engages.

Because the cam groove 163 and the cam groove 164 are formed at the cam barrel 160, it is preferable if the cam follower 86 of the lens frame 80 and the cam follower 96 of the linking tube 91 are disposed between the mating portions 82 and 92, when viewed in the optical axis X direction. Therefore, the clearance hole 97 extends to an opposite side away from the cam follower 96 of the linking tube 91.

The lens frame 80 has an outer diameter $D_{80}$ that is smaller than an inner diameter $D_{91}$ of the linking tube 91. The insertion hole 99 of the linking tube 91 has a width substantially the same as the inner diameter $D_{91}$ of the linking tube 91. Thus, the lens frame 80 may be inserted to the inner side of the linking tube 91 through the insertion hole 99.

When structures relating to the assembly 10 of the lenses L3, L4 and L5 are assembled (see FIG. 16), for example, a sequence as follows may be included. Firstly, the lens frame 90 retaining the lens L5 is mounted to the rear end of the linking tube 91. Then, the flange portion 72 of the lens frame 70 retaining the lens L3 is attached to the front end of the linking tube 91. Because the linking tube 91 is not yet attached to other members, a positional relationship between the lens L3 and the lens L5 is easily adjusted, and optical axes thereof may be made to precisely coincide.

Next, the lens frame 80 retaining the lens L4 is inserted through the insertion hole 99 in the linking tube 91 side face to the inner periphery side of the linking tube 91. By this procedure, the positional relationship of the lenses L3 and L5 retained at the two ends of the linking tube 91 is thoroughly adjusted and the lens L4 is easily assembled therebetween. This excellent workability is also advantageous when storing and maintaining the lens barrel 100.

When the lens frame 80 is inserted into the linking tube 91, the mating portions 82 of the lens frame 80 are disposed at the same position as the mating portions 92 of the linking tube 91 (which are hidden behind the mating portion 82 in FIG. 18), and the guide bar 192 is inserted through both. Similarly, the engaging portion 84 of the lens frame 80 is disposed at the same position as the engaging portion 94 of the linking tube 91 (which is hidden behind the engaging portion 84 in FIG. 18), and the guide bar 194 is engaged with both.

In the assembly 10 that has been completed in this manner, of the guide bars 192 and 194 that are integral with the support portion 118 at the rear side (see FIG. 16), the guide bar 192 is passed through the mating portions 92 and 82 and the guide bar 194 is engaged with the engaging portions 94 and 84. Hence, the pair of guide bars 192 and 194 and the assembly 10 may be handled integrally.

The cam barrel 160 is fitted onto the outer side of the linking tube 91. The cam followers 86 and 96 are attached to the lens frame 80 and the linking tube 91 so as to penetrate through the cam grooves 163 and 164 of the fitted on cam barrel 160. It is preferable if the attachment positions of the cam followers 86 and 96 are provided at positions closer to the mating portions 82 and 92 in the circumferential directions of the lens frame 80 and linking tube 91, in ranges that do not impede insertion of the guide bar 192 into the mating portions 82 and 92. Thus, driving efficiency of the cam barrel 160 with respect to the lens frame 80 and linking tube 91 may be improved.

Next, the assembly 10, guide bars 192 and 194 and rear side support portion 118 that have been made integral are inserted into the fixed tube 110 from the rearward, the front end portions of the guide bars 192 and 194 are fit into a front side support portion 118, and the rear side support portion 118 is fixed to the fixed tube 110.

Next, a zoom ratio change operation of the lens barrel 100 is described.

In the lens barrel 100, when a rotating operation in which the zoom ring 130 rotates about the optical axis X is applied, the middle tube 140, to which rotary driving force is transmitted through the cam follower 142 engaged with the guide groove 132, rotates. When the middle tube 140 rotates, the outer tube 150 is translated along the linear groove 143 by driving force transmitted from the cam groove 144 to the cam follower 152. Thus, the lens frame 159 engaged with the distal end of the outer tube 150 and the lens L1 retained by the lens frame 159 move integrally.

Further, when the middle tube 140 rotates, rotary driving force is also transmitted to the cam barrel 160, through the cam follower 162 engaged with the linear groove 146, and the cam barrel 160 rotates. When the cam barrel 160 rotates, the cam barrel 160 provides relative rotary driving force to the fixed tube 110, through the cam pin 116 of the fixed tube 110 that is engaged with the cam groove 166 of the cam barrel 160. Because the fixed tube 110 is fixed to the imaging unit 200, in accordance with the shape of the cam groove 166, the cam barrel 160 is translated while rotating.

When the cam barrel 160 is translated, the cam follower 147 is translated along the elongated hole 114 of the fixed tube 110. Consequently, the interior tube 141 is translated in association with the cam follower 147. When the interior tube 141 is translated, the middle tube 140 is translated due to the engaging groove 148 engaging with the engaging protrusion 149 of the interior tube 141.

Because the front end portion 124 of the transmission member 122 is inserted into the linear groove 176 of the linking ring 170, rotation of the linking ring 170 is restrained. Therefore, when the cam barrel 160 rotates and is translated, the linking ring 170, which is linked to the cam barrel 160 by the cam followers 172 engaged with the cam grooves 161, is translated. Thus, the lens L2 retained by the lens frame 189 is translated.

In the present embodiment, The cam followers 172 are provided at the linking ring 170 and the cam grooves 161 are provided at the cam barrel 160. However, the same functionality is provided if, for example, the cam grooves 161 are provided at the linking ring 170 and the cam followers 172 are provided at the cam barrel 160. The same applies to the other engagements of groove portions with protrusion portions.

The other cam grooves 163 and 164 of the moving cam barrel 160 drive the cam follower 96 of the linking tube 91 and the cam follower 86 of the lens frame 80. Because the linking tube 91 and the lens frame 80 fit into and engage with the guide bars 192 and 194 and rotation is restrained, the linking tube 91 and the lens frame 80 are translated when driven by the cam barrel 160.

A cover tube 155, which is mounted coaxially with the fixed tube 110, is provided between the outer tube 150 and the zoom ring 130. The cover tube 155 advances and withdraws in association with the outer tube 150, and seals a gap between the outer tube 150 and the zoom ring 130. Accordingly, the ingression of foreign matter into the lens barrel 100 is prevented.

Thus, when the zoom ring 130 is rotated, all of the lenses L1, L2, L3, L4 and L5 move in the optical axis X direction. Moreover, because the linking tube 91 and the lens frames 159, 189 and 80 are driven by respective individual driving mechanisms, they have individual moving distances. Therefore, the focusing distance of the lens barrel 100 may be changed.

Next, a focusing operation of the lens barrel 100 is described. When the focusing ring 120 of the lens barrel 100 is rotated, or when the motor in the motor chamber 115 operates, the transmission member 122 rotates along the outer periphery of the fixed tube 110. The rotary driving force thereof is transmitted from the front end portion 124 of the transmission member 122 to the linear groove 176 of the linking ring 170, and the linking ring 170 is rotated.

Thus, the cam followers 172 of the linking ring 170 are translated while rotating along the cam grooves 161 individually with respect to the other lenses L1, L3, L4 and L5. In the present embodiment, the focusing position of the lens barrel 100 may be moved by translating the lens L2. Therefore, light flux passing through the optical system that includes the lenses L1, L2, L3, L4 and L5 may be caused to focus at the light detection surface of the image sensor or the like by the lens L2 being translated while positions on the optical axis X direction of the lenses L1, L3, L4 and L5 are kept fixed.

Figure 19:
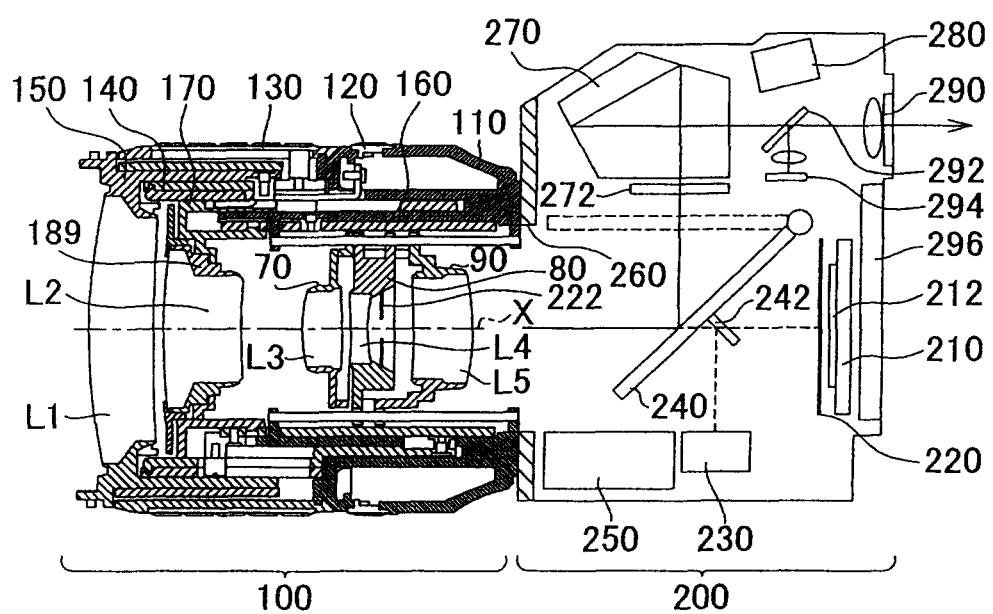
FIG. 19 is a figure schematically illustrating the construction of an imaging device.

FIG. 19 is a figure schematically illustrating the construction of an imaging device 300 that is provided with the lens barrel 100. In order to avoid confusion of the content of the drawing, the lens barrel 100 is schematically drawn in FIG. 19. However, the lens barrel 100 in FIG. 19 has the same construction as the lens barrel 100 illustrated in FIG. 14 to FIG. 18. Accordingly, the same reference numerals are assigned to common structural elements and duplicative descriptions are not given.

The imaging device 300 includes the lens barrel 100 and the imaging unit 200. The lens barrel 100 is detachably mounted to a mounting portion 260 of the imaging unit 200.

The lens barrel 100 mounted at the imaging device 300 is electrically connected to the imaging unit 200 via unillustrated contact points. Hence, the lens barrel 100 is supplied with electricity from the imaging unit 200. Signals are also transmitted from the lens barrel 100 to the imaging unit 200.

The imaging unit 200 accommodates an optical system, which includes a main mirror 240, a pentaprism 270 and an eyepiece optical system 290, and a main control unit 250. The main mirror 240 moves between a standby position, disposed at an angle on the optical path of incident light that is incident through the optical system of the lens barrel 100, and an imaging position (shown by broken lines in the drawing), raised to avoid the incident light.

At the standby position, the main mirror 240 guides most of the incident light to a focusing screen 272 that is disposed thereabove. The focusing screen 272 is disposed at a position that produces an image when the optical system of the lens barrel 100 is focused, and visualizes this image.

The image formed at this focusing screen 272 is observed through the eyepiece optical system 290, via the pentaprism 270. Thus, an image on the focusing screen 272 may be viewed as an upright image through the eyepiece optical system 290.

A half-mirror 292 is disposed between the pentaprism 270 and the eyepiece optical system 290. The half-mirror 292 superimposes a display image, which is formed at a viewfinder LCD 294, on the focusing screen 272 image. Thus, the focusing screen 272 image and the viewfinder LCD 294 image can be viewed together at the emission end of the eyepiece optical system 290. Information on imaging conditions, setting conditions and suchlike of the imaging device 300 is displayed at the viewfinder LCD 294.

A portion of light emitted from the pentaprism 270 is guided to a photometry unit 280. The photometry unit 280 measures intensities and spectra of incident light and the like, and the measurement results are referred to when determining imaging conditions.

A sub-mirror 242 is disposed at a rear face of the main mirror 240 relative to an incidence face of the incident light. The sub-mirror 242 guides a portion of the incident light that has passed through the main mirror 240 to a focusing point detection device 230 disposed therebelow. Thus, when the main mirror 240 is in the standby position, the focusing point detection device 230 detects a focus point adjustment condition of the optical system. When the main mirror 240 moves to the imaging position, the sub-mirror 242 is also withdrawn from the optical path of the incident light.

Behind the main mirror 240 with respect to the incident light from the lens barrel 100, a shutter 220, an optical filter 212 and an imaging device 210 are disposed along the optical axis. When the shutter 220 is opened, the main mirror 240 moves to the imaging position just before the shutter 220 opens. Thus, the incident light advances and is incident on the imaging device 210. Accordingly, an image formed of the incident light is converted to electronic signals at the imaging device 210.

The imaging unit 200 is provided, at the rear face thereof relative to the lens barrel 100, with a main LCD 296 which faces outward. The main LCD 296, in addition to displaying various kinds of setting information for the imaging unit 200, can display the image that is formed at the imaging device 210 when the main mirror 240 has moved to the imaging position.

The main control unit 250 performs overall control of the various operations described above. An autofocus mechanism may be formed that drives the lens barrel 100 with reference to information of the distance to an object, which is detected by the focusing point detection device 230 at the imaging unit 200. A focus assistance mechanism may also be formed, with the focusing point detection device 230 referring to operating distances of the lens barrel 100.

The main control unit 250 exchanges information with a microprocessor of the lens barrel 100, and controls opening and closing of an aperture device 222 and so forth. The main control unit 250 also contributes to automation of exposure, execution of scene modes, execution of bracket photography and the like.

Hereabove, the embodiments have been used to describe the present invention, but the technical scope of the invention is not to be limited to the scope described in the above embodiments. It will be clear to practitioners skilled in the art that numerous modifications and improvements may be applied to the above embodiments. It will be clear from the recitations of the attached claims that modes to which these modifications and improvements are applied are to be encompassed by the technical scope of the invention.

Sequences of execution in processing of operations, procedures, steps, stages and the like in devices, systems, programs and methods illustrated in the attached claims, the specification and the attached drawings should be considered as being realized by arbitrary sequences, unless specifically clarified with "prior to", "preceding" or the like and unless output of preceding processing is to be used in succeeding processing. Even where operational flows are described with "firstly", "next" and the like for convenience in the attached claims, the specification and the attached drawings, this does not mean that execution in such sequences is necessary.

What is claimed is:

1. A lens barrel comprising:
  a first retention member that includes a first engaging portion, which engages with a first guide shaft, and that retains a first optical system and a second optical system, which is different from the first optical system, to be integrally movable along the first guide shaft; and
  a second retention member that includes a second engaging portion, which engages with the first guide shaft, and that retains a third optical system, which is disposed between the first optical system and the second optical system, to be movable independently of the first and second optical systems along the first guide shaft, wherein:
  the first retention member includes a third engaging portion that engages with the first guide shaft at a spacing from the first engaging portion,
  the second retention member includes a fourth engaging portion that engages with the first guide shaft at a spacing from the second engaging portion, and
  the first and third engaging portions and the second and fourth engaging portions alternatingly engage with the first guide shaft.

2. The lens barrel according to claim 1, wherein:
  the first retention member has a shape of a cylindrical tube with a predetermined radial thickness,
  the second retention member is disposed inside the first retention member,
  the first guide shaft is disposed outside the first retention member, and
  the second engaging portion engages with the first guide shaft through a cutout provided in the first retention member.

3. The lens barrel according to claim 2, wherein the second engaging portion is separable from the second retention member.

4. The lens barrel according to claim 2, wherein the first retention member is provided with a reinforcement member at a position of the cutout that does not interfere with the second engaging portion.

5. The lens barrel according to claim 1, wherein the first guide shaft is disposed at the same side of the first retention member as the second retention member.

6. The lens barrel according to claim 1, wherein the first retention member comprises an aperture portion with a size that enables insertion of the second retention member on a periphery side of the first retention member.

7. The lens barrel according to claim 6, wherein the aperture portion has the size that enables insertion of the second retention member while in a state in which an optical axis of the second optical system is substantially parallel with a central axis of the first retention member.

8. The lens barrel according to claim 6, further comprising:
  a second guide shaft provided in parallel with the first guide shaft, wherein:
    the first retention member is provided with a fifth engaging portion that engages with the second guide shaft and restrains movement of the first retention member in a circumferential direction,
    the first engaging portion and the fifth engaging portion are disposed at positions that are substantially opposite to each other along a peripheral face of the first retention member if viewed in a direction of a central axis of the first retention member, and
    the aperture portion is formed at a position that coincides with the engaging portion if viewed in the direction of the central axis of the first retention member.

9. The lens barrel according to claim 6, further comprising:
  a second guide shaft provided in parallel with the first guide shaft, wherein at least one of the first guide shaft and the second guide shaft is disposed along an outer periphery of the first retention member.

10. The lens barrel according to claim 6, further comprising:
  a second guide shaft provided in parallel with the first guide shaft, wherein:
    the second retention member is provided with a fifth engaging portion, which engages with the second guide shaft so as to be movable along the second guide shaft, and
    the second engaging portion and the fifth engaging portion are formed integrally with the second retention member.

11. The lens barrel according to claim 6, wherein:
  the first retention member is provided with a bearing member that receives driving force when moving along the first guide shaft, and
  the bearing member and the aperture portion are disposed at positions that are substantially opposite to each other along the peripheral face of the first retention member if viewed in the direction of a central axis of the first retention member.

12. An imaging device comprising:
  the lens barrel according to claim 1; and
  an imaging unit that captures an image imaged by the lens barrel.

13. A method of fabrication of a lens barrel, comprising:
  providing a first retention member that includes a first engaging portion, which engages with a first guide shaft, and that retains a first optical system and a second optical system, which is different from the first optical system, to be integrally movable along the first guide shaft; and
  disposing a second retention member that includes a second engaging portion, which engages with the first guide shaft, and that retains a third optical system, which is different from the first optical system and the second optical system, in the first retention member, wherein:
  the third optical system is movable independently of the first and second optical systems,
  the first retention member includes a third engaging portion that engages with the first guide shaft at a spacing from the first engaging portion,
  the second retention member includes a fourth engaging portion that engages with the first guide shaft at a spacing from the second engaging portion, and
  the first and third engaging portions and the second and fourth engaging portions alternatingly engage with the first guide shaft.

14. The method of fabrication of the lens barrel according to claim 13, comprising:
  providing an aperture portion with a size that enables insertion of the second retention member to a periphery side of the first retention member;
  inserting the second retention member into the first retention member through the aperture portion and disposing the first optical system, the second optical system and the third optical system in order in the first retention member; and
  inserting the first guide shaft through the first retention member and the second retention member.

15. The method of fabrication of the lens barrel according to claim 14, wherein the second retention member is inserted into the first retention member after the first optical system and the third optical system have been retained in the first retention member.

* * * * *